US012759850B1

(12) United States Patent
Holmquist

(10) Patent No.: US 12,759,850 B1
(45) Date of Patent: Oct. 13, 2026

(54) LIFTING SYSTEM WITH STABLE AND SYNCHRONIZED LIFTING OPERATION

(71) Applicant: Savage Industrial, LLC, Scottsdale, AZ (US)

(72) Inventor: Carson Holmquist, Scottsdale, AZ (US)

(73) Assignee: Savage Industrial, LLC, Scottsdale, AZ (US)

( * ) Notice: Subject to any disclaimer, the term of this patent is extended or adjusted under 35 U.S.C. 154(b) by 0 days.

(21) Appl. No.: 19/381,118

(22) Filed: Nov. 6, 2025

(51) Int. Cl.

| | |
|---|---|
| ***B66F 3/46*** | (2006.01) |
| ***B66F 3/28*** | (2006.01) |
| ***B66F 3/38*** | (2006.01) |
| ***B66F 3/42*** | (2006.01) |
| ***B66F 17/00*** | (2006.01) |

(52) U.S. Cl.
CPC .................. *B66F 3/46* (2013.01); *B66F 3/38* (2013.01); *B66F 3/42* (2013.01); *B66F 3/28* (2013.01); *B66F 17/00* (2013.01)

(58) Field of Classification Search
CPC ...... B66F 3/46; B66F 3/38; B66F 3/42; B66F 3/28; B66F 17/00
See application file for complete search history.

(56) References Cited

U.S. PATENT DOCUMENTS

| | | | | |
|---|---|---|---|---|
| 4,599,034 | A * | 7/1986 | Kennedy | B66F 7/22 254/89 R |
| 6,971,654 | B2 * | 12/2005 | Amsili | B62B 1/125 280/47.27 |
| 7,219,770 | B2 | 5/2007 | Baker et al. | |
| 9,334,145 | B2 * | 5/2016 | Fagan | B66F 7/10 |
| 9,352,944 | B2 | 5/2016 | Fagan et al. | |
| 9,611,128 | B2 * | 4/2017 | Van Houten | B66F 7/20 |
| 2025/0214821 | A1 * | 7/2025 | Smith | B66F 3/46 |

* cited by examiner

*Primary Examiner* — Seahee Hong
(74) *Attorney, Agent, or Firm* — CALDWELL LLC

(57) ABSTRACT

A lifting system with stable and synchronized lifting operation is disclosed. The lifting system includes a plurality of lifting units, wherein the plurality of lifting units are configured to vertically translate a load in a synchronous action and each of the plurality of lifting units includes a support column configured to vertically extend and retract as a function of a lifting command, a lift plate detachably mounted on the support column, a base assembly configured to support the support column on a ground surface and an anti-tip mechanism configured to provide mechanical resistance to rotational displacement of each lifting unit relative to a ground surface and a system controller configured to receive a user input, generate the lifting command as a function of the user input and transmit the lifting command to each of the plurality of lifting units.

19 Claims, 9 Drawing Sheets

LIFTING SYSTEM WITH STABLE AND SYNCHRONIZED LIFTING OPERATION

FIELD OF THE INVENTION

The present invention generally relates to the field of a lifting system. In particular, the present invention is directed to a lifting system with stable and synchronized lifting operation.

BACKGROUND

Conventional lifting systems used for elevating, loading, or transporting heavy equipment and modular structures often suffer from limitations in mobility, synchronization, safety, and adaptability across varied environments. In industrial, construction, and remote field settings, users are frequently required to lift large and heavy loads without access to fixed infrastructure like cranes or built-in hydraulic lift gates. Existing solutions are typically constrained by surface requirements, or human strength. Accordingly, there is a need for an improved lifting system that addresses the challenges.

SUMMARY OF THE DISCLOSURE

In some aspects, the techniques described herein relate to a lifting system with stable and synchronized lifting operation, the lifting system including a plurality of lifting units, wherein the plurality of lifting units are configured to vertically translate a load in a synchronous action and each lifting unit of the plurality of lifting units includes a support column configured to vertically extend and retract as a function of a lifting command, a lift plate detachably mounted on the support column, wherein at least a portion of the load is configured to be positioned on the lift plate, a base assembly configured to support the support column on a ground surface, and an anti-tip mechanism configured to provide mechanical resistance to rotational displacement of each lifting unit relative to a ground surface, thereby maintaining a fixed transport position when each lifting unit is tilted and moved, and a system controller communicatively connected to each lifting unit of the plurality of lifting units, wherein the system controller is configured to receive a user input, generate the lifting command as a function of the user input, and transmit the lifting command to each of the plurality of lifting units.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to lifting systems with stable and synchronized lifting operation. The lifting system includes a plurality of lifting units, wherein the plurality of lifting units are configured to vertically translate a load in a synchronous action and each lifting unit of the plurality of lifting units includes a support column configured to vertically extend and retract as a function of a lifting command, a lift plate detachably mounted on the support column, wherein at least a portion of the load is configured to be positioned on the lift plate, a base assembly configured to support the support column on a ground surface, and an anti-tip mechanism configured to provide mechanical resistance to rotational displacement of each lifting unit relative to a ground surface, thereby maintaining a fixed transport position when each lifting unit is tilted and moved, and a system controller communicatively connected to each lifting unit of the plurality of lifting units, wherein the system controller is configured to receive a user input, generate the lifting command as a function of the user input, and transmit the lifting command to each of the plurality of lifting units.

Exemplary embodiments illustrating aspects of the present disclosure are described below in the context of several specific examples.

Figure 1:
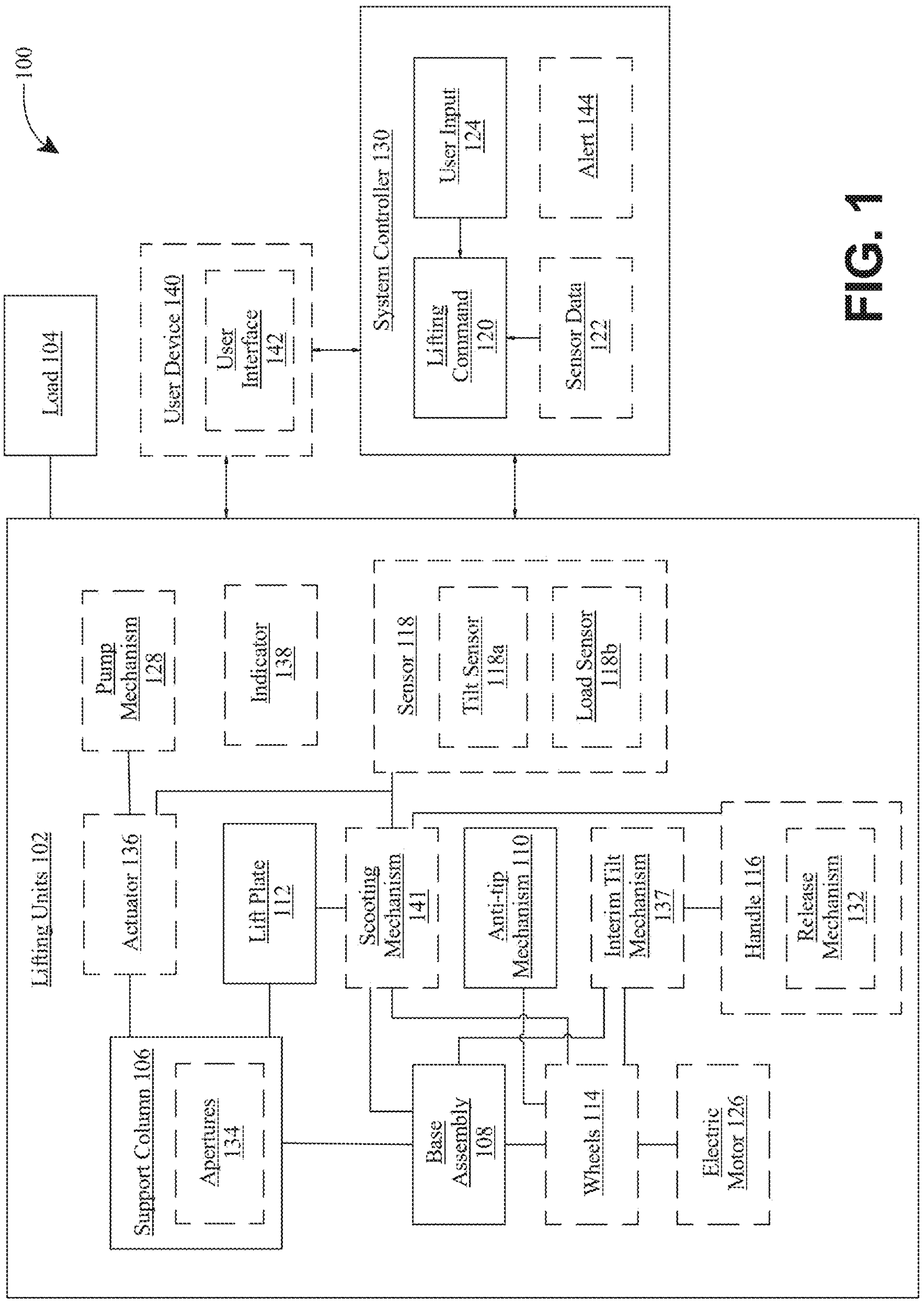
FIG. 1 illustrates a block diagram of an exemplary lifting system for with stable and synchronized lifting operation.

Referring now to FIG. 1, an exemplary embodiment of a lifting system 100 with stable and synchronized lifting operation is illustrated. For the purposes of this disclosure, a "lifting system" is a coordinated assembly to raise, lower, or maintain a load. In some cases, lifting system 100 may include multiple mechanical, structural, and electronic components. In some cases, lifting system 100 may include synchronization functionality enabling simultaneous and balanced operation across multiple lifting units 102. In a non-limiting example, lifting system 100 may include 8 lifting units 102. In another non-limiting example, lifting system 100 may include 4 lifting units 102. The lifting unit 102 disclosed herein is further described below. For the purposes of this disclosure, a "lifting operation" is a coordinated process in which one or more lift units are employed to raise, lower, or maintain a load at a desired elevation relative to a support surface. A lifting operation may include initiation, control, synchronization, and completion of vertical translation of a load 104. In some cases, a lifting operation may involve positioning lifting units 102 in relation to a load 104, configuring system parameters such as height, alignment, or weight distribution, and executing controlled actuation to move the load 104 vertically while maintaining balance and stability.

With continued reference to FIG. 1, in some cases, lifting system 100 may be used for a wide range of field, industrial, and logistical applications across diverse sectors. In a non-limiting example, in manufacturing and warehousing environments, lifting system 100 may facilitate end-of-line lifting operations by enabling efficient loading directly onto trailers or repositioning of heavy items within facility floors, thereby reducing physical strain on staff and minimizing dependency on fixed material-handling infrastructure. In another non-limiting example, in renewable energy applications such as solar and wind farm installations, lifting system 100 may provide stable and rugged support for transporting and positioning equipment on uneven terrain, offering adaptability to the remote and variable conditions typical of such sites. In another non-limiting example, in agricultural operations, lifting system 100 may be used to assist in the assembly of farm machinery, movement of large components, or setup of barns and similar structures, delivering versatile lifting functionality suited to dynamic farm environments. In another non-limiting example, in the construction and roadwork sectors, lifting system 100 may offer height-adjustable offloading capabilities and stable equipment handling on semi-unstable surfaces, aiding contractors in the placement and installation of tools and materials. In another non-limiting example, in military and defense logistics, lifting system 100 may serve as a reliable field-ready solution for transporting and deploying modular units and support equipment in terrains where traditional lifting systems may be ineffective. In another non-limiting example, in transloading operations at border crossing stations such as those along the Mexico-U.S. border, lifting system 100 may assist in the handling of over-dimensional cargo, enabling seamless transfer and offloading of oversized loads. In another non-limiting example, in pallet loading applications, lifting system 100 may function as a lift gate alternative, enabling field-based pallet movement onto trucks without the need for integrated hydraulic platforms. In another non-limiting example, in mobile home logistics, lifting system 100 may provide secure and stable lifting support for positioning mobile units on uneven terrain. In another non-limiting example, in oil and gas operations, lifting system 100 may be used for transporting and elevating heavy machinery or structural modules in off-road, rugged work sites. In another non-limiting example, in modular and non-modular construction and infrastructure projects, lifting system 100 may provide reliable lifting and repositioning functionality on semi-stable job sites. In another non-limiting example, in the energy sector, lifting system 100 may facilitate transport and deployment of equipment in remote, hard-to-access environments. In another non-limiting example, for government applications, lifting system 100 may serve as a practical solution for infrastructure and operational deployments in locations unsuitable for conventional lifts. In another non-limiting example, in mining operations, lifting system 100 may support the movement and placement of heavy equipment on rocky or uneven terrain. In another non-limiting example, in remote markets, lifting system 100 may be deployed to provide essential lifting functionality in off-the-grid areas. In another non-limiting example, in transportation logistics, lifting system 100 may facilitate cargo loading and transfer in conditions where traditional lift infrastructure is unavailable or impractical.

With continued reference to FIG. 1, lifting system 100 includes a plurality of lifting units 102. For the purposes of this disclosure, a "lifting unit" is a device that is a part of a lifting system to vertically translate a load. In a non-limiting example, lifting unit 102 may be used to position and support loads 104 during lifting procedures. In some cases, lifting unit 102 may operate individually. In some cases, lifting unit 102 may operate in synchronization with additional lifting units 102 to distribute load forces and achieve balanced elevation of the load 104. In some cases, lifting unit 102 may be positioned beneath or adjacent to a load 104 to be lifted. In some cases, lifting unit 102 may be constructed from high-strength, field-durable materials selected to ensure structural integrity, stability, and longevity under varying load conditions and environmental exposures. In some embodiments, structural components of lifting unit 102, such as support column 106, base assembly 108, anti-tip mechanism 110, and lift plate 112, may be fabricated from welded steel or high-grade structural aluminum alloys. The support column 106, base assembly 108, anti-tip mechanism 110 and lift plate 112 are described in detail below. In some cases, supplemental components of lifting units 102, such as wheels 114, handles 116, or sensor housings, may incorporate reinforced polymers, composite materials, or stainless steel. The wheels 114 and handles 116 are described in detail below. In some cases, components of lifting unit 102 may include one or more surface coatings and/or modifications that reduce the likelihood of unwanted adhesion or interference with external components. The choice of materials may vary according to specific application environment, expected load capacities, and mobility requirements of lifting unit 102. In some cases, each lifting unit 102 may weigh from approximately 900 pounds to 1,200 pounds, depending on material selection, base reinforcement, and accessory integration. For example, and without limitation, each lifting unit 102 may weigh approximately 1,025 pounds. For instance, and without limitation, each lifting unit 102 may weigh around 950 pounds.

With continued reference to FIG. 1, a plurality of lifting units 102 are configured to vertically translate a load 104 in a synchronous action. For the purposes of this disclosure, a "load" is any object that is intended to be lifted, supported, transported, or positioned by a lifting system. In some cases, load 104 may vary in weight, shape, configuration. As a non-limiting example, load 104 may include industrial equipment, modular structures, pallets, construction materials, mobile housing units, or machinery components. In some cases, load 104 may be static or dynamic in nature, and the lifting system 100 may be configured to maintain stability, balance, and control of the load 104 throughout a lifting cycle.

With continued reference to FIG. 1, for the purposes of this disclosure, "vertical translation" of a load is a controlled upward or downward movement of the load along a substantially linear path that is perpendicular to a ground surface. In a non-limiting example, vertical translation may be performed to raise a load 104 from a lower elevation to a higher elevation. In another non-limiting example, vertical translation may be performed to lower a load 104 from a raised position to a desired resting level. In some cases, vertical translation may maintain a load's horizontal alignment relative to a base of a lifting unit 102 or ground surface. In some cases, vertical translation may be performed incrementally or continuously. In some cases, vertical translation may involve synchronized actuation of multiple lifting units 102 to maintain uniform elevation of a load 104, where the load 104 may be distributed across multiple points of support. In some cases, lifting unit 102 may be configured to begin lifting from a starting height approximately 3 inches or 4 inches. In a non-limiting example, lifting unit 102 may be configured to begin lifting from a starting height as low as approximately 3.25 inches off ground surface. In some cases, the starting height may be equivalent to a ground surface level. In some embodiments, vertical travel range of lifting unit 102 may be between 36 inches and 48 inches. In a non-limiting example, vertical travel range of lifting unit 102 may be approximately 41 inches in one configuration. In another non-limiting example, vertical travel range of lifting unit 102 may be approximately 36 inches. In some cases, vertical travel range of lifting unit 102 may be above 48 inches. In some cases, vertical travel range of lifting unit 102 may be below 36 inches. In some embodiments, each lifting unit of a plurality of lifting units 102 may have ranging from 10,000 pounds to 20,000 pounds lifting capacity per lift. For example, and without limitation, each lifting unit 102 may have approximately 15,000 pounds lifting capacity per lift. For example, and without limitation, each lifting unit 102 may have approximately 18,000 pounds lifting capacity per lift.

With continued reference to FIG. 1, for the purposes of this disclosure, a "ground surface" is a physical surface upon which a lifting unit is placed and supported during operation. In some cases, ground surface may serve as a foundational interface for a base assembly of each lifting unit 102 and bear distributed load transferred through support column 106 and other structural components during a lifting operation. As a non-limiting example, ground surface may include a variety of terrains or materials such as concrete slabs, gravel, compacted soil, pavement, metal platforms, or other stable or semi-stable surfaces encountered in industrial, field, or construction environments. In some cases, characteristics of a ground surface, such as levelness, firmness, and friction, may influence stability, deployment strategy, and performance of lifting unit 102. In some embodiments, lifting unit 102 may include features such as an anti-tip mechanism 110, adjustable base elements, or sensors 118 to adapt to irregularities or inclines in the ground surface. Proper engagement with the ground surface is essential to ensure safe, balanced, and effective lifting operations. The anti-tip mechanism 110 and sensors disclosed herein are further described in detail below.

With continued reference to FIG. 1, in some cases, each lifting unit 102 may be battery-powered with an integrated lithium battery system rated at approximately 200 amp-hours (Ah), supporting full-field operability without reliance on external power infrastructure. In some cases, the battery system may be recharged using a standard 110V AC power source. In some embodiments, lifting unit 102 may be equipped with additional or substitute charging methods to support various deployment conditions. For example, and without limitation, lifting unit 102 may include a dual-voltage charging interface compatible with 220V AC input for faster recharge cycles in industrial settings. For example, and without limitation, lifting unit 102 may be configured with swappable battery modules that can be rapidly exchanged with pre-charged units to minimize operational downtime. For example, and without limitation, in remote or off-grid environments, lifting unit 102 may be equipped with auxiliary solar charging panels or connected to portable generator systems to ensure continued battery operation where conventional grid access is unavailable. In some cases, when fully charged or powered, each lifting unit 102 may complete approximately between 24 and 40 full lift cycles. In some cases, a full lift cycle may be defined as one 41-inch vertical ascent followed by one 41-inch vertical descent if a vertical travel capacity of a lifting unit 102 is 42 inches. In a non-limiting example, when fully charged or powered, each lifting unit 102 may complete approximately 32 full lift cycles. In another non-limiting example, when each lifting unit 102 may complete closer to 40 full lift cycles.

With continued reference to FIG. 1, for the purposes of this disclosure, a "synchronous action" is a coordinated operation performed by two or more lift units such that their respective movements or responses occur at substantially the same time. In a non-limiting example, a synchronous action of multiple lifting units 102 may indicate a simultaneous and uniform vertical translation of a load 104, each lifting unit 102 responding to a same lifting command 120 with coordinated timing and displacement to maintain consistent elevation and balance across the supported load 104. The lifting command 120 is described further in detail below. For example, and without limitation, a synchronous action may ensure that no individual lifting unit 102 advances or lags significantly relative to others, thereby minimizing tilt, stress, or structural imbalance during a lifting operation. In some cases, synchronous action may include synchronized halting, descent, or adjustment in response to external conditions, sensor data 122, user input 124, and the like. The user input 124 and sensor data 122 disclosed herein are further described in detail below.

With continued reference to FIG. 1, in some embodiments, lifting system 100 and/or lifting unit 102 may be portable. For the purposes of this disclosure, "portability" refers to a capability for an object to be carried or moved. In some implementations, lifting system 100 and/or lifting unit 102 may include wheels 114, handles 116, lifting points, or a modular frame to facilitate movement. In some embodiments, lifting system 100 and/or lifting unit 102 may be mounted on a transportable platform. For instance, and without limitation, lifting system 100 and/or lifting unit 102 may be mounted on a trailer or skid for ease of relocation. In some embodiments lifting system 100 and/or lifting unit 102 may be stationary. For the purposes of this disclosure, a "stationary system" is a system that remains fixed in place. In a non-limiting example, lifting system 100 and/or lifting unit 102 may be permanently installed on the ground, embedded in a foundation, or secured to a structure. In some embodiments, lifting system 100 and/or lifting unit 102 may be configurable to operate in both portable and stationary modes.

With continued reference to FIG. 1, in some cases, each lifting unit 102 of a plurality of lifting units 102 may include a plurality of wheels 114. In some cases, a plurality of wheels 114 may be configured to enable mobility of each lifting unit 102 of a plurality of lifting units 102 across a ground surface. For the purposes of this disclosure, "wheels" are rotational mechanical components that enable translational movement of an object across a ground surface. In some cases, wheels 114 may facilitate mobility by allowing lifting unit 102 to be positioned manually or mechanically at a desired location prior to, or following, a lifting operation. In some cases, wheels 114 may be fixed, swivel-mounted, or incorporate locking mechanisms depending on required maneuverability and stability of lifting unit 102 in a given environment. In some embodiments, wheels 114 may be powered by an electric motor 126 to enable self-propelled movement, for example, in field conditions where manual repositioning is impractical. In other cases, wheels 114 may be passive and used in conjunction with handles or towing equipment. In some cases, wheels 114 may be removably attached to an electric motor housing. In some cases, wheels 114 may be removably attached to lifting unit 102. For the purposes of this disclosure, "removably attached" refers to an ability for an object that is attached to another object to be unattached from the other object without damaging or breaking said objects. In some cases, wheels 114 may be permanently attached to an electric motor housing. For the purposes of this disclosure, "permanent attachment" refers to something that is fixed, secured, or affixed in a way that it cannot be detached or removed. Wheels may be constructed from high-durability materials such as polyurethane, rubber, or metal alloys to support heavy loads and resist wear on a variety of surfaces, including concrete, gravel, or uneven terrain. The integration of wheels into lifting unit 102 allows for flexible deployment and repositioning in dynamic operational environments such as warehouses, construction sites, and remote field locations.

Figure 5A:
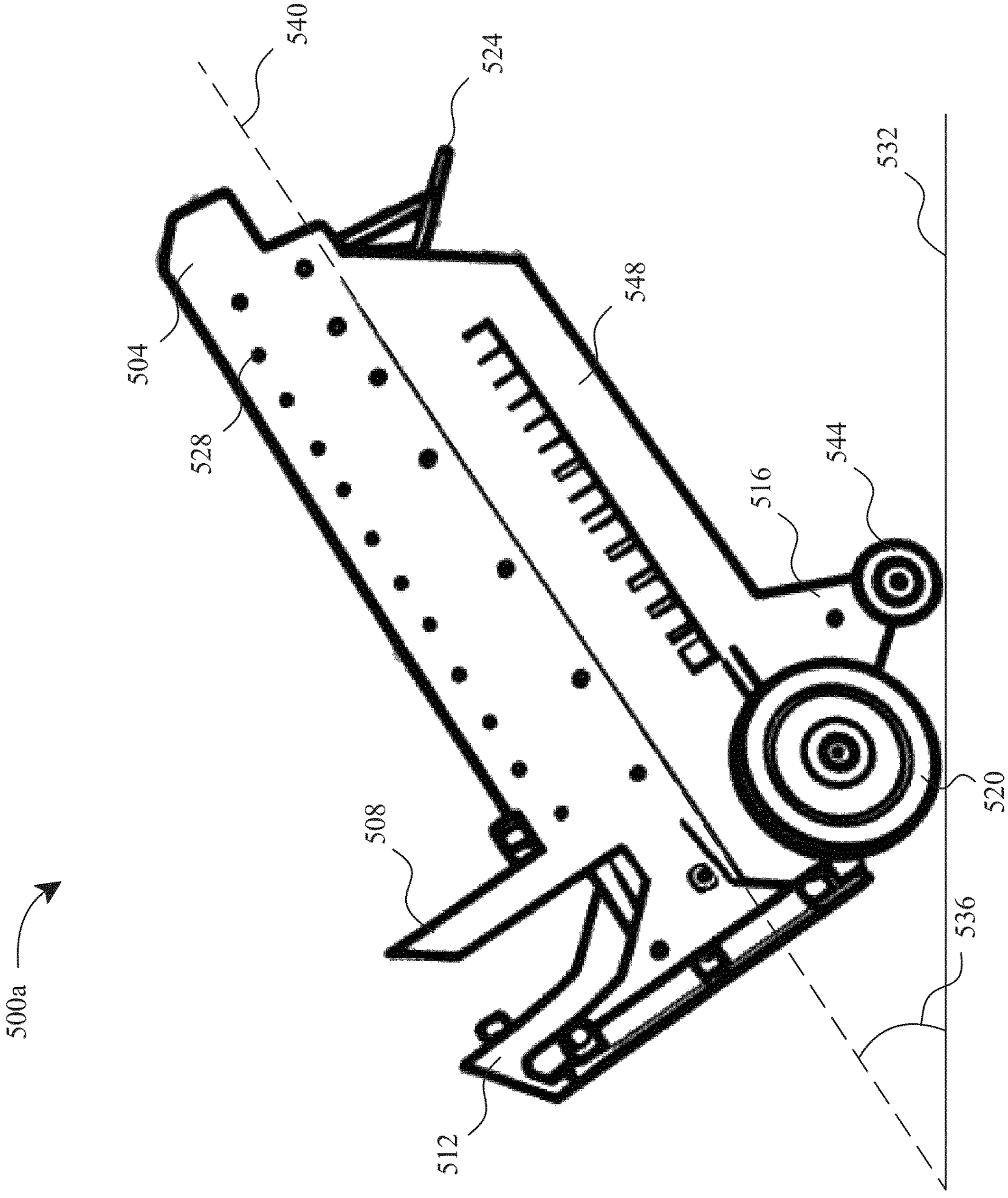
FIG. 5A illustrates a side view of an exemplary lifting unit in a fixed transport position.
Figure 5B:
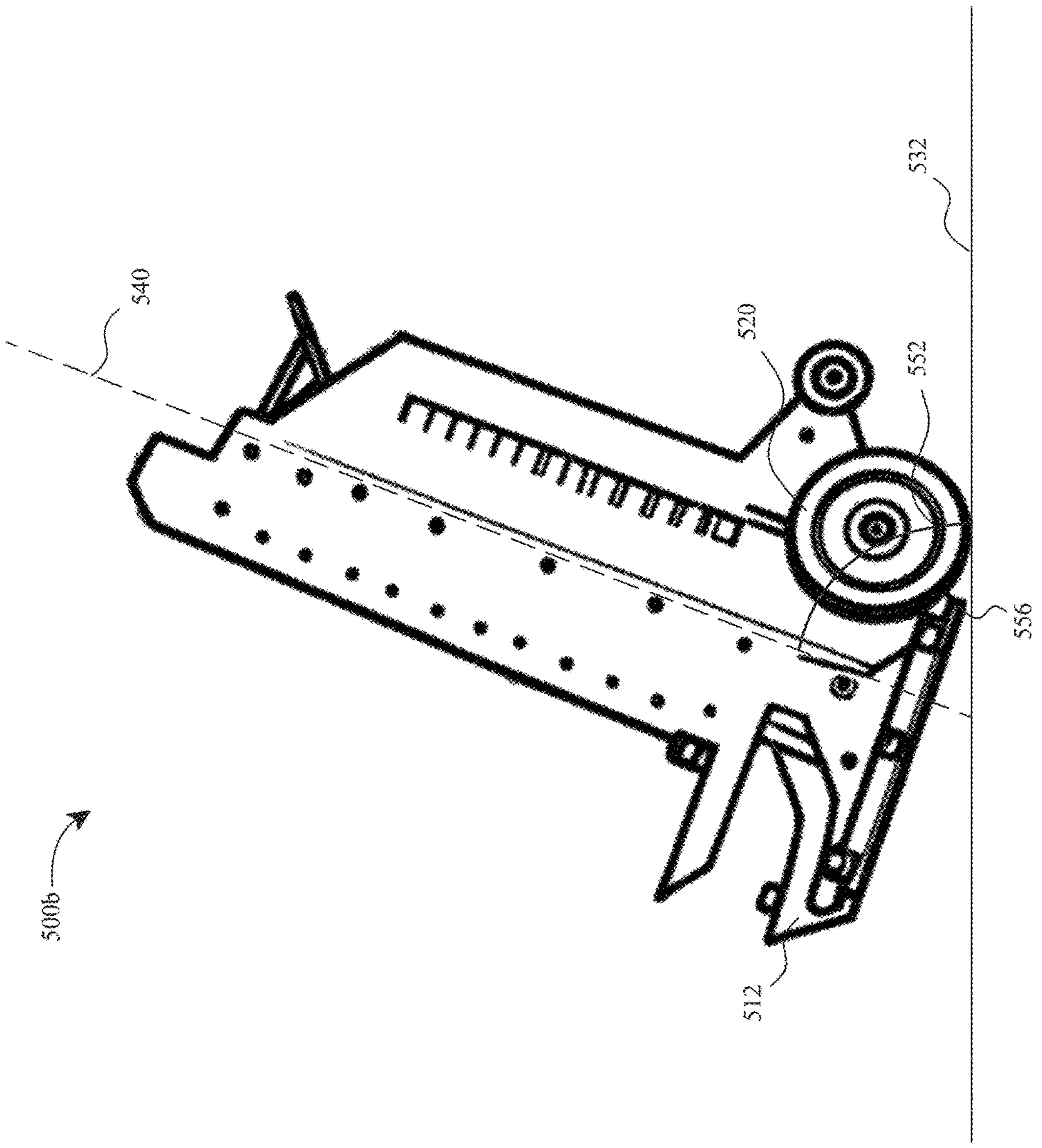
FIG. 5B illustrates a side view of an exemplary lifting unit in an interim tilt position.
Figure 5C:
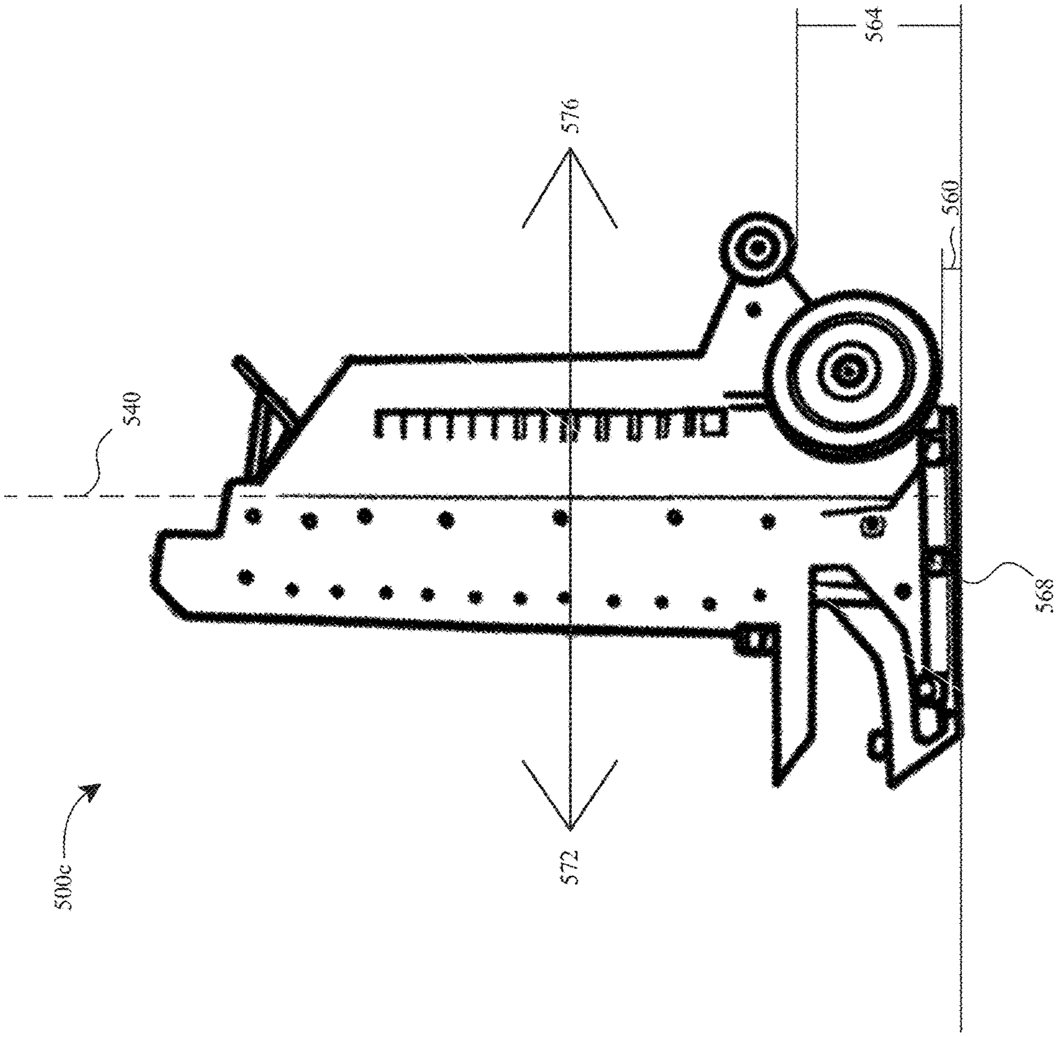
FIG. 5C illustrates a side view of an exemplary lifting unit in an upright lifting position.

With continued reference to FIG. 1, in some cases, lifting unit 102 may include an electric motor housing. As used in this disclosure, an "electric motor housing" is an outer structure configured to contain an electric motor. In some cases, electric motor housing may include a durable, lightweight material such as without limitation, plastic, metal, and/or the like. In some embodiments, electric motor housing may be designed and configured to protect an electric motor 126. In some cases, wheels 114 may be attached to electric motor housing. In a non-limiting example, wheels 114 may be attached to electric motor housing at a first distance relative to the ground surface such that, in an upright lifting position, a bottommost surface of each of the wheels 114 is elevated above ground surface. The first distance and the upright lifting position are illustrated in FIG. 5C. For the purposes of this disclosure, an "upright lifting position" refers to an orientation of a lifting unit in which a support column is substantially vertical relative to the ground surface and the base assembly rests in full contact with the ground surface. In a non-limiting example, lifting unit 102 may be configured to raise or lower a load 104 through vertical translation of lift plate 112. In the upright lifting position, lifting unit 102 may be stabilized for lifting operations and may be not tilted rearward into a transport configuration. In a non-limiting example, central vertical axis of lifting unit 102, or of its support column 106, may be substantially perpendicular to the ground surface in an upright lifting position. In a non-limiting example, the base assembly 108 of lifting unit 102 may rest flat on the ground surface. In some cases, first distance may indicate vertical spacing between the ground surface and the bottommost surface of the wheels 114 when the lifting unit 102 is in the upright lifting position. For the purposes of this disclosure, a "bottommost surface" of a wheel refers to the lowest point of the wheel relative to the ground surface when a lifting unit is in an upright lifting position. In a non-limiting example, bottommost surface may correspond to the lowest circumferential point of each wheel 114 along its rotational profile. In some cases, first distance may include a range of 0.5 inches to 5 inches. As a non-limiting example, first distance between a bottommost surface of wheels 114 and the ground surface may include 1.5 inches. As another non-limiting example, first distance between a bottommost surface of wheels 114 and the ground surface may include 4.8 inches.

With continued reference to FIG. 1, in some cases, lifting unit 102 may include a fork pocket. For the purposes of this disclosure, a "fork pocket" is a recessed or enclosed channel, sleeve, or opening that receives forks of a forklift. In some embodiments, fork pocket may be fabricated as a pair of parallel, rigid enclosures spaced to accommodate standard forklift fork dimensions. The fork pocket may allow for safe and efficient lifting of heavy components without requiring direct manual handling or disassembly. In some cases, fork pocket may be integrated into base assembly 108.

With continued reference to FIG. 1, each of a plurality of lifting units 102 may include an electric motor 126. In some cases, a plurality of wheels 114 may be operatively connected to and powered by an electric motor 126. An "electric motor," for the purposes of this disclosure, is a device that converts electrical energy into mechanical energy. In some embodiments, an electric motor 126 may be used to drive auxiliary systems such as powered wheels 114 for mobility, a pump mechanism 128 for hydraulic actuation, or other mechanical subsystems requiring controlled rotational motion. In some cases, electric motor 126 may be powered by an onboard battery system and may operate under direct current (DC) or alternating current (AC). In some embodiments, electric motor 126 may be integrated with a gearbox or transmission assembly to regulate torque and speed output in accordance with operational demands. In some cases, control of electric motor 126 may be coordinated through a lifting unit's microcontroller or system controller 130, allowing for responsive and precise activation based on user input 124 or automated lifting commands.

With continued reference to FIG. 1, in some cases, each lifting unit 102 of a plurality of lifting units 102 may include a handle 116. For the purposes of this disclosure, a "handle" is a user-interfacing structural component affixed to or integrated with a lifting unit. In some embodiments, handle 116 may be configured to enable manual manipulation, positioning, or control of a lifting unit 102 by a user. In a non-limiting example, handle 116 may be used to guide or steer lifting unit 102 during transport, assist in stabilization during deployment, or engage control functions such as braking or activation of motorized wheels. In some cases, handle 116 may be rigidly mounted or pivotably connected to a frame or base assembly of a lifting unit 102. In some cases, handle 116 may be designed with ergonomic features to facilitate safe and efficient use in field conditions. In some cases, handle 116 may be constructed from metal tubing, composite materials, or reinforced polymers. In some cases, handle 116 may be foldable, retractable, or detachable to accommodate storage or transport constraints. In some embodiments, handle 116 may incorporate integrated control elements. In some cases, handle 116 may include a release mechanism 132. For the purposes of this disclosure, a "release mechanism" is a control feature that interrupts, disables, or halts a specific function. In some cases, release mechanism 132 may serve to enhance operational safety and user control by preventing unintended actuation or enabling immediate disengagement of a system under specific conditions. In a non-limiting example, release mechanism 132 may be configured to halt actuation of a plurality of wheels 114 powered by an electric motor 126 upon release of a handle 116 by a user. In some embodiments, release mechanism 132 may be mechanically or electronically linked to powered wheels 114, hydraulic pumps, or other active subsystems of a lifting unit 102. In a non-limiting example, activation of release mechanism 132 may result in a cessation of motion, deactivation of electrical power, or engagement of a braking system to bring a lifting unit 102 to a stop. For example, and without limitation, release mechanism 132 may include a deadman release mechanism, which is configured to halt actuation of powered wheels 114 or other systems upon release by a user. Continuing the non-limiting example, the deadman release mechanism may require continuous manual engagement, such as pressing or gripping a handle-mounted control, to maintain active operation. Upon release, release mechanism 132 may default to a safe, non-operational state. In another non-limiting example, release mechanisms 132 may include push-button shutoffs, tethered interlocks, or sensor-based triggers.

With continued reference to FIG. 1, each lifting unit 102 of a plurality of lifting units 102 includes a support column 106 configured to vertically extend and retract as a function of a lifting command 120. The lifting command 120 described herein is further described in detail below. For the purposes of this disclosure, a "support column" is a structural element of a lifting unit that provides a primary mechanical pathway for vertical translation of a lift plate. In some cases, support column 106 may be configured to extend and retract along a substantially linear axis of a lifting unit 102 in response to lifting commands 120. In some cases, support column 106 may define a plurality of apertures 134. For the purposes of this disclosure, an "aperture" is a defined opening, hole, or void formed within a structural component. In some cases, an aperture 134 may be located on support column 106. In some cases, an aperture 134 may be configured to receive a locking pin or engagement feature of a lift plate 112, thereby enabling discrete and adjustable positioning of the lift plate 112 along an vertical axis of the support column 106. In a non-limiting example, aperture 134 may serve as a mechanical interface that allows for selective alignment and securement of moving or detachable parts. In some embodiments, apertures 134 may be arranged in a linear or patterned array along a length of support column 106 to provide multiple height adjustment positions. In some cases, size, shape, and spacing of each aperture 134 may vary depending on structural requirements, locking mechanisms, or compatibility with other components. In some cases, apertures 134 may function as access points for fasteners, sensor mounts, or other auxiliary attachments integrated into lifting unit 102.

With continued reference to FIG. 1, in some embodiments, support column 106 may include an actuator 136. In some cases, actuator 136 may be internal or external to support column 106. For the purposes of this disclosure, an "actuator" is a component of a machine that is responsible for moving and/or controlling a mechanism or system. The actuator 136 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, the actuator 136 may have an energy or power source other than control signal. This may include a main energy source, which may include for example electric power, hydraulic power, pneumatic power, mechanical power, and the like. In some cases, upon receiving a control signal, the actuator 136 may respond by converting source power into mechanical motion. In some cases, the actuator 136 may be understood as a form of automation or automatic control.

With continued reference to FIG. 1, in some embodiments, an actuator 136 may include a hydraulic actuator. For the purposes of this disclosure, a "hydraulic actuator" is a mechanical device that converts fluid pressure into linear motion to produce controlled force and displacement. In some cases, hydraulic actuator may function as a primary mechanism for vertical translation of lift plate 112, enabling lifting and lowering of a load 104 in response to a lifting command 120. In some cases, hydraulic actuator may operate by receiving pressurized hydraulic fluid, delivered through a pump mechanism 128, which acts on a piston or ram housed within a cylinder, causing axial movement along a defined path (e.g., support column 106). This movement may directly or indirectly drive the extension or retraction of a lifting mechanism. In some embodiments, actuator 136 may be configured with sensors 118 to monitor stroke position, pressure levels, or load response. In some embodiments, actuator 136 may be integrated into a closed-loop control system for synchronized operation across multiple lift units. In some cases, hydraulic actuator may include of a cylinder or fluid motor that uses hydraulic power to facilitate mechanical operation. Output of the hydraulic actuator may include mechanical motion, such as without limitation linear, rotatory, or oscillatory motion. In some cases, the hydraulic actuator may employ a liquid hydraulic fluid. As liquids, in some cases. are incompressible, a hydraulic actuator can exert large forces. Additionally, as force is equal to pressure multiplied by area, the hydraulic actuators may act as force transformers with changes in area (e.g., cross sectional area of cylinder and/or piston). An exemplary hydraulic cylinder may consist of a hollow cylindrical tube within which a piston can slide. In some cases, the hydraulic cylinder may be considered single acting. The single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. The double acting may be used when pressure is applied substantially on each side of a piston; any difference in resultant force between the two sides of the piston causes the piston to move.

With continued reference to FIG. 1, in some embodiments, an actuator 136 may include a pneumatic actuator. In some cases, the pneumatic actuator may enable considerable forces to be produced from relatively small changes in gas pressure. In some cases, the pneumatic actuator may respond more quickly than other types of actuators, for example hydraulic actuators. The pneumatic actuator may use compressible fluid (e.g., air). In some cases, the pneumatic actuator may operate on compressed air. Operation of hydraulic and/or pneumatic actuators may include control of one or more valves, circuits, fluid pumps, and/or fluid manifolds.

With continued reference to FIG. 1, an actuator 136 may be an electric actuator. In some embodiments, the electric actuator may include any electromechanical actuators, linear motors, and the like. In some cases, the actuator 136 may include an electromechanical actuator. The electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor 126, for instance a control signal may control one or more electric motor parameters to control electromechanical actuator. Exemplary non-limitation electric motor parameters include rotational position, input torque, velocity, current, and potential. The electric actuator may include a linear motor. The linear motors may differ from electromechanical actuators, as power from linear motors is output directly as translational motion, rather than output as rotational motion and converted to translational motion. In some cases, the linear motor may cause lower friction losses than other devices. The linear motors may be further specified into at least 3 different categories, including flat linear motor, U-channel linear motors and tubular linear motors.

The linear motors may be directly controlled by a control signal for controlling one or more linear motor parameters. Exemplary linear motor parameters include without limitation position, force, velocity, potential, and current.

With continued reference to FIG. 1, in some embodiments, an actuator 136 may include a mechanical actuator. In some cases, the mechanical actuator may function to execute movement by converting one kind of motion, such as rotary motion, into another kind, such as linear motion. An exemplary mechanical actuator may include a rack and pinion. In some cases, a mechanical power source, such as a power take off may serve as power source for the mechanical actuator. The mechanical actuators may employ any number of mechanisms, including for example without limitation gears, rails, pulleys, cables, linkages, and the like.

With continued reference to FIG. 1, in some cases, support column 106 may include a pump mechanism 128. For the purposes of this disclosure, a "pump mechanism" is any element of a mechanical component that converts mechanical power into fluidic energy. As a non-limiting example, pump mechanism 128 may include a substantially constant pressure pump (e.g., centrifugal pump) or a substantially constant flow pump (e.g., positive displacement pump, gear pump, and the like). Pump mechanism 128 can be hydrostatic or hydrodynamic. A pump mechanism 128 may generate flow with enough power to overcome pressure induced by a load at a pump outlet. A pump mechanism 128 may generate a vacuum at a pump inlet, thereby forcing fluid from a reservoir into the pump inlet to the pump and by mechanical action delivering this fluid to a pump outlet. Hydrostatic pumps may be positive displacement pumps. Hydrodynamic pumps can be fixed displacement pumps, in which displacement may not be adjusted, or variable displacement pumps, in which the displacement may be adjusted. In some cases, pump mechanism 128 may be configured to supply pressurized fluid to actuator 136 or hydraulic actuator to initiate a movement of lift plate 112. In a non-limiting example, during a lifting operation, pump mechanism 128 may draw hydraulic fluid from a reservoir and direct it under pressure into an actuator chamber, causing actuator 136 to extend and thereby raise a lift plate 112 and associated load 104. In a non-limiting example, to lower the load, pump mechanism 128 may redirect or release hydraulic pressure, allowing the actuator 136 to retract in a controlled manner. Exemplary non-limiting pump mechanisms 128 include gear pumps, rotary vane pumps, screw pumps, bent axis pumps, inline axial piston pumps, radial piston pumps, and the like. Pump mechanism 128 may be powered by any rotational mechanical work source, for example without limitation and electric motor or a power take off from an engine.

With continued reference to FIG. 1, each lifting unit 102 of a plurality of lifting units 102 includes a lift plate 112 detachably mounted on a support column 106. At least a portion of a load 104 is configured to be positioned on a lift plate 112. For the purposes of this disclosure, a "lift plate" is a load-bearing platform or structural interface. In some cases, lift plate 112 may be configured to receive, support, and vertically translate at least a portion of a load 104 during a lifting operation performed by a lifting unit 102. In some cases, a lift plate 112 may be mechanically connected to a support column 106 of a lifting unit 102. In some cases, a lift plate 112 may move in response to commands (e.g., lifting command 120), either through direct actuation by a hydraulic actuator 136 or through a guided mechanism integrated within a lifting system. In some cases, a lift plate 112 may serve as a primary contact surface for a load 104 being elevated. In some cases, a lift plate 112 may be designed with features such as reinforcement ribs, engagement points, or pin interfaces to securely accommodate different load geometries. As a non-limiting example, a lift plate 112 may include at least one locking pin configured to engage with a plurality of apertures 134. For the purposes of this disclosure, a "locking pin" is a mechanical fastener configured to engage with an aperture in order to secure another component in a fixed position. In some cases, a locking pin may be used to maintain a vertical position of a lift plate 112 relative to a support column 106 by selectively engaging one of multiple apertures 134 along the support column 106. In some cases, locking pin may be manually inserted and withdrawn. In some cases, locking pin may be configured with a spring-loaded or quick-release mechanism. When engaged, in a non-limiting example, a locking pin may prevent unintended movement of a lift plate 112 during loading, lifting, or transport. In some cases, a locking pin may be cylindrical, tapered, or otherwise shaped to match the geometry of apertures 134. In some cases, a locking pin may be made from high-strength materials such as hardened steel or reinforced alloys. In some embodiments, multiple locking pins may be used in parallel. In some embodiments, lift plate 112 may be detachably mounted to allow for interchangeability with an alternative lift plate suited to specific load types or operational requirements. In some cases, lift plate 112 may include surface treatments, anti-slip coatings, or integrated alignment guides to enhance load stability during movement.

With continued reference to FIG. 1, in some cases, lift plate 112 may be vertically aligned with a base assembly 108 such that a lifting force vector remains within a footprint of the base assembly 108. The base assembly 108 disclosed herein is further described in detail below. For the purposes of this disclosure, a "lifting force vector" is a directional representation of a mechanical force applied by a lifting unit. In some cases, lifting force vector may originate from a point of contact between a lift plate 112 and a load 104 and extend upward along an axis of vertical translation. In a non-limiting example, lifting force vector may define both the magnitude and direction of an applied force. In a properly aligned system, for example, and without limitation, a lifting force vector may be substantially collinear with a central axis of a support column 106 and remain within a horizontal footprint of a base assembly 108. For the purposes of this disclosure, a "footprint" of a base assembly refers to a two-dimensional boundary or projected area on a ground surface that is enclosed by outermost edges of the base assembly of a lifting unit. This footprint may represent a structural contact area through which a lifting unit 102 distributes its weight and any applied load forces onto the ground surface during operation. In a non-limiting example, a lift plate 112 may be positioned directly above, or substantially centered over, a base assembly 108 when a load 104 is applied. This may ensure that gravitational and lifting forces exerted during vertical translation act in a direction that is mechanically supported by the base assembly 108. As a result, the load 104 may not generate torque, tipping moments, or lateral instability, because the force is distributed directly downward through a structural center or footprint of the base assembly 108.

With continued reference to FIG. 1, for the purposes of this disclosure, "detachably mounted" refers to a structural or mechanical configuration in which one component is affixed to another in a manner that allows for secure attachment during normal operation but also permits intentional removal or replacement without causing damage to either component. In a non-limiting example, a lift plate 112 may be detachably mounted to a support column 106, meaning it can be installed or removed using mechanical fasteners, pins, brackets, or quick-release mechanisms. In some cases, a detachable configuration may enable versatility in a lifting unit 102 by allowing different lift plates or accessories to be interchanged based on a size, shape, or handling requirements of a load 104. In some cases, a detachable configuration may facilitate maintenance, transport, and storage by enabling partial disassembly of a lifting unit 102.

With continued reference to FIG. 1, for the purposes of this disclosure, an "alternate lift plate" is a lift plate that differs in design, geometry, material, or functional features from a standard or default lift plate. An alternate lift plate may be configured to be interchangeably mounted to the support column of the lifting unit 102. In some cases, alternate lift plate may be intended to accommodate specific operational requirements, load types, or environmental conditions that may not be optimally supported by a standard lift plate configuration. As a non-limiting example, an alternate lift plate may have a modified surface area, reinforced structure, or integrated engagement features such as channels, hooks, or mounting brackets to interface with uniquely shaped or oversized loads. For example, and without limitation, an alternate lift plate may include a fork-type lift plate configured with a pair of laterally spaced lifting arms or tines extending forward. In another non-limiting examples, an alternate lift plate may be fabricated from lighter materials for applications requiring reduced overall unit weight, or from corrosion-resistant materials for use in outdoor, marine, or chemically exposed environments.

With continued reference to FIG. 1, each lifting unit 102 of a plurality of lifting units 102 includes a base assembly 108. For the purposes of this disclosure, a "base assembly" is a foundational structural component of a lifting unit that supports the support column and interfaces directly with the ground surface to provide stability during lifting operations. Base assembly 108 is configured to support a support column 106 on a ground surface. In a non-limiting example, base assembly 108 may be configured to distribute a weight of a lifting unit 102 and a load 104 uniformly over a footprint, ensuring balance and resistance to tipping. In some cases, base assembly 108 may include integrated structural elements. As a non-limiting example, base assembly 108 may include frame members, mounting brackets, and reinforcements. In some cases, base assembly 108 may incorporate functional components. As a non-limiting example, base assembly 108 may include wheels 114, leveling mechanisms for use on uneven terrain, or attachment points for tilt supports or sensors 118. In some cases, footprint of a base assembly 108 may be rectangular, square, or application-specific in shape. In some cases, footprint of a base assembly 108 may be sized to accommodate expected center of gravity and load characteristics of a lifting unit 102. As a non-limiting example, base assembly 108 may have dimensions of 25-35 inches by 20-30 inches. For example, base assembly 108 may have dimensions of approximately 29 inches by 24 inches. For example, base assembly 108 may have dimensions of approximately 31 inches by 28 inches.

With continued reference to FIG. 1, each lifting unit 102 of a plurality of lifting units 102 includes an anti-tip mechanism 110. Anti-tip mechanism 110 is configured to provide mechanical resistance to rotational displacement of each lifting unit 102 relative to a ground surface, thereby maintaining a fixed transport position when each lifting unit 102 is tilted and moved. For the purposes of this disclosure, an "anti-tip mechanism" is a structural or mechanical feature that provides mechanical resistance to rotational displacement of a lifting unit relative to a ground surface when the unit is tilted and moved. In a non-limiting example, anti-tip mechanism 110 may function to maintain a fixed transport position by limiting a degree of backward rotation when a lifting unit 102 is tilted, thereby preventing the lifting unit from tipping beyond a controlled and stable angle. In some embodiments, anti-tip mechanism 110 may include a protruding support structure, roller, or contact surface. As a non-limiting example, anti-tip mechanism 110 may include a wheel guard, angled race, caster, rolling element, and the like. In some cases, anti-tip mechanism 110 may be fixed, spring-loaded, or foldable. In some embodiments, anti-tip mechanism 110 may be positioned above wheels 114. In some embodiments, anti-tip mechanism 110 may be positioned on an electric motor housing. In a non-limiting example, an engagement of anti-tip mechanism 110 may act as a mechanical stop, distributing part of a lifting unit's weight and preserving balance during movement. For example, and without limitation, an anti-tip mechanism may include a ground-contact support extension located above and rearward of wheels 114 of a base assembly 108 or electric motor housing. Continuing the non-limiting example, when a user tilts a lifting unit 102 backward using an handle 116 to roll it into a fixed transport position, anti-tip mechanism 110 may come into contact with a ground surface once the lifting unit reaches a predefined tilt angle.

With continued reference to FIG. 1, for the purposes of this disclosure, "mechanical resistance" refers to an opposition in response to an applied force, motion, or deformation. Mechanical resistance may function to inhibit or limit movement, absorb energy, or stabilize components under operational loads. For example, and without limitation, an anti-tip mechanism may generate mechanical resistance to rotational displacement by physically contacting a ground surface and preventing further tipping motion, thereby maintaining a fixed transport position. In some embodiments, anti-tip mechanism 110 may be structurally configured to withstand a weight of lifting unit 102 when the lifting unit 102 is tilted into its fixed transport position. When the lifting unit 102 is inclined and supported by an anti-tip mechanism 110 during movement, a portion of the lifting unit's overall weight may be transferred through the anti-tip mechanism 110 to a ground surface. Accordingly, anti-tip mechanism 110 may provide sufficient mechanical resistance to support this partial load without deformation, structural failure, or loss of stability.

With continued reference to FIG. 1, for the purposes of this disclosure, "rotational displacement" refers to an angular movement of a structural component about a rotational axis relative to a ground surface. In a non-limiting example, rotational displacement may include a change in angular orientation of a lifting unit 102 when it is tilted from its upright position into a fixed transport position.

With continued reference to FIG. 1, for the purposes of this disclosure, a "fixed transport position" is an angular orientation of a lifting unit relative to a ground surface in which the lifting unit is partially tilted for movement but mechanically constrained from rotating further. In a fixed transport position, a lifting unit 102 may be intentionally inclined (e.g., rearward) so that wheels 114 engage the ground for rolling, while an anti-tip mechanism 110 or structural stop maintains the lifting unit 102 at a consistent tilt angle to prevent over-rotation or tip-over. For the purposes of this disclosure, a "tilt angle" is an angular deviation of a reference axis of a lifting unit from a perpendicular orientation relative to a ground surface. In a non-limiting example, tilt angle may quantify a degree to which a lifting unit 102 has been inclined from its upright position during operations such as manual transport or positioning. As a non-limiting example, tilt angle may range from 40 degrees to 60 degrees. For example, and without limitation, anti-tip mechanism 110 may be configured to maintain a fixed transport position of each lifting unit 102 such that a central vertical axis of the lifting unit 102 is oriented at a 49-degree tilt angle relative to a ground surface. For another example, and without limitation, the tilt angle may include 52 degrees relative to a ground surface. The central vertical axis of a lifting unit 102 or support column is illustrated in FIGS. 5A-C. For the purposes of this disclosure, a "central vertical axis" refers to an imaginary longitudinal line that extends vertically through a geometric center of a lifting unit or a support column, when the lifting unit is in an upright and level orientation on a ground surface.

With continued reference to FIG. 1, in some cases, anti-tip mechanism 110 may include a protruding contact structure. In some cases, a protruding contact structure may be configured to engage with a ground surface when each lifting unit 102 is tilted such that a central vertical axis of each lifting unit 102 is oriented at a range between 45 to 55 degree tilt angle relative to the ground surface. For the purposes of this disclosure, a "protruding contact structure" is a projecting component of an anti-tip mechanism that extends outward from a primary structural element of a lifting unit. In a non-limiting example, protruding contact structure may be configured to engage with the ground surface when a lifting unit 102 is tilted into a fixed transport position, providing a mechanical stop that limits further rotation of the lifting unit 102 beyond a predefined tilt angle. In some embodiments, a protruding contact structure may include a rigid arm, bracket, or support frame attached to an electric motor housing. In some cases, protruding contact structure of an anti-tip mechanism 110 may include a ground contact roller positioned at an end of the protruding contact structure. For the purposes of this disclosure, a "ground-contact roller" is a rotational component that provides a rolling interface that facilitates movement of a lifting unit along a ground surface. In some cases, ground contact roller may be configured to engage with a ground surface and roll along the ground surface when a lifting unit 102 is in the fixed transport position. In some embodiments, ground-contact roller may have a diameter within a range of about 3 inches to 6 inches. In some cases, wheels 114 may have a diameter within a range of about 8 inches to 14 inches. In some cases, ground-contact roller may be smaller than wheels 114. As a non-limiting example, when a diameter of wheels 114 is 10 inches, a diameter of ground-contact roller may be 4 inches. In another non-limiting example, when a diameter of wheels 114 is 12 inches, a diameter of the ground-contact roller may be 5 inches.

With continued reference to FIG. 1, in some cases, anti-tip mechanism 110 (e.g., ground-contact roller) may be affixed to electric motor housing at a second distance relative to the ground surface. In some cases, second distance may be longer than first distance between a bottommost surface of each of a plurality of wheels 114 and the ground surface. For the purposes of this disclosure, a "second distance" refers to a distance between the ground surface and the bottommost surface of a ground-contact roller of an anti-tip mechanism when a lifting unit is in an upright lifting position. In some cases, second distance between bottommost surface of a ground-contact roller and the ground surface may include a range of 6 to 12 inches. For example, and without limitation, ground-contact roller may be positioned on an electric motor housing at a distance of 8 inches from a ground surface while the first distance between wheels 114 and the ground surface is 3 inches. For example, and without limitation, ground-contact roller may be positioned on an electric motor housing at a distance of 10 inches from a ground surface while the first distance between wheels 114 and the ground surface is 4 inches. In a non-limiting example, anti-tip mechanism 110 may be located on a support column 106 so that the anti-tip mechanism 110 does not contact the ground during an upright operation but engages the ground only after a lifting unit 102 has been intentionally tilted to its fixed transport position.

With continued reference to FIG. 1, in some cases, each lifting unit 102 of plurality of lifting units may include an interim tilt mechanism 137 configured to support the lifting unit 102 in an interim tilt position at an interim tilt angle relative to the ground surface. For the purposes of this disclosure, an "interim tilt mechanism" refers to a structural feature of a lifting unit that is configured to support the lifting unit in an interim tilt position. As a non-limiting example, interim tilt mechanism 137 may include or implement base assembly 108, wheels 114, handle 116, and the like. For the purposes of this disclosure, an "interim tilt position" refers to a transitional orientation of a lifting unit between an upright lifting position and a fixed transport position, in which a rear edge of a base assembly and a plurality of wheels are in contact with the ground surface. For the purposes of this disclosure, a "rear edge" of a base assembly refers to a portion of the base assembly located opposite the front-facing side of a lifting unit and adjacent to or proximate to a plurality of wheels and oriented toward a handle used for tilting and transporting the lifting unit. In some embodiments, rear edge of base assembly 108 may be a linear or contoured structural boundary that extends laterally across the base assembly 108. In some cases, rear edge may be reinforced or shaped to distribute contact forces and resist wear caused by repeated engagement with the ground surface. In some cases, application of a downward tilting force to lifting unit 102 may transition lifting unit 102 from interim tilt position to fixed transport position in which a plurality of wheels 114 and anti-tip mechanism 110 are in contact with the ground surface. During manual tilting of lifting unit 102, rear edge of base assembly 108 first contacts the ground surface at an interim tilt angle, providing mechanical support and stability before further rotation causes the 114 and ground-contact roller of anti-tip mechanism 110 to contact the ground in the fixed transport position. For the purposes of this disclosure, an "interim tilt angle" is an angular orientation of a central vertical axis of a lifting unit when the lifting unit is positioned in an interim tilt position relative to a ground surface. In some cases, lifting unit 102 in an interim tilt position may be positioned between an upright lifting position, where a central vertical axis is substantially perpendicular to the ground surface, and a fixed transport position, where the central vertical axis is inclined at a fixed tilt angle. In some cases, interim tilt angle may provide a stable or semi-stable resting orientation, enabling a user to pause before applying additional force to tilt lifting unit 102 into a fixed transport position. In some embodiments, interim tilt angle may include a range of 60 degrees to 85 degrees relative to the ground surface. As a non-limiting example, interim tilt angle may include 75 degree relative to the ground surface. As another non-limiting example, interim tilt angle may include 80 degree relative to the ground surface. For the purposes of this disclosure, a "downward tilting force" refers to a user-applied force directed downward on a portion of a lifting unit that causes the lifting unit to rotate rearward about its wheels or base edge relative to a ground surface. In some cases, downward tilting force may generate torque about the contact point of wheels 114 or base assembly 108, thereby transitioning lifting unit 102 from one orientation to another. As a non-limiting example, downward tilting force may transition lifting unit 102 from an upright lifting position to an interim tilt position or from the interim tilt position to a fixed transport position. In some embodiments, downward tilting force may be applied by a user pushing downward on a handle 116 located at the rear of lifting unit 102.

With continued reference to FIG. 1, in some cases, each lifting unit of a plurality of lifting units 102 may include at least one sensor 118. For the purposes of this disclosure, a "sensor" is a device that produces an output signal for the purpose of sensing a physical phenomenon. For example, and without limitation, at least a sensor 118 may transduce a detected phenomenon, such as without limitation, temperature, voltage, current, pressure, speed, motion, light, moisture, and the like, into a sensed signal. At least a sensor 118 may output the sensed signal. At least a sensor 118 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor may include circuitry, computing devices, electronic components or a combination thereof that translates into at least an electronic signal configured to be transmitted to another electronic component. In a non-limiting embodiment, at least a sensor 118 may include a plurality of sensors.

With continued reference to FIG. 1, in some cases, at least one sensor 118 may include a tilt sensor **118*a* configured to detect angular deviation of a support column 106 relative to a central vertical axis perpendicular to a ground surface. For the purposes of this disclosure, a "tilt sensor" is an electronic or electromechanical component configured to detect and measure an angular orientation or inclination of a structure relative to a reference plane. In a non-limiting example, a tilt sensor 118*a* may monitor angular deviation of a support column 106 or overall lifting unit 102 from a vertical (e.g., central vertical axis of a support column 106 or lifting unit 102) or predetermined axis to determine whether the lifting unit 102 is positioned within acceptable operational parameters. As a non-limiting example, tilt sensor 118*a* may include accelerometers, electrolytic sensors, gyroscopes, or micro-electromechanical systems (MEMS)-based devices. In some cases, tilt sensor 118*a* may output analog or digital signals corresponding to the measured tilt angle. In some cases, the signals may be transmitted to a system controller 130, which may use sensor data 122 to generate warnings, adjust lifting commands 120, or halt operation if the tilt exceeds a defined safety threshold. In some embodiments, tilt sensor 118*a* may be used to monitor angular stability of each lifting unit 102 during lifting, transport, or deployment. For the purposes of this disclosure, "angular deviation" refers to a measured difference in angle between a reference axis and an actual orientation of that axis relative to a reference plane. In some cases, angular deviation may quantify an extent to which a lifting unit 102** or one of its components tilts away from its intended upright or level position during operation. In a non-limiting example, excessive angular deviation may indicate a potential tipping condition, uneven load distribution, or deployment on sloped or unstable terrain.

With continued reference to FIG. 1, in some cases, at least one sensor 118 may include a load sensor 118 configured to measure a force exerted on a lift plate 112 from at least a portion of a load 104. For the purposes of this disclosure, a "load sensor" is a sensor that detects and measures a force or weight applied to a structural component. In some cases, load sensor **118*b* may convert mechanical force into a corresponding electrical signal, which may be processed by a system controller 130 to monitor real-time load conditions during a lifting operation. In some cases, a load sensor 118*b* may be integrated beneath or in connection with a lift plate 112, support column 106, or hydraulic actuator 136. In some cases, a load sensor 118*b* may be configured to determine whether an applied load 104 is within the system's rated capacity. As a non-limiting example, load sensor 118*b* may include strain gauge, piezoelectric, hydraulic pressure, or capacitive sensing technology. In some cases, load sensor 118*b* may enable a system controller 130 to perform functions such as automatic load balancing, overload detection, or lift synchronization by providing accurate weight distribution data across multiple lifting units 102. In a non-limiting example, each lifting unit 102 may be equipped with a load sensor 118*b* configured to detect a magnitude of force or weight applied to a lift plate 112 during a lifting operation. A system controller 130 may be communicatively connected to the load sensors 118*b* of a plurality of lifting units 102 and configured to receive real-time force data from each unit. Based on this input (e.g., sensor data 122), the system controller 130 may determine whether the load 104 is evenly distributed across the lifting units 102 or if one or more lifting units 102 are bearing a disproportionate share of the total load. In response, the system controller 130 may generate lifting commands 120 that dynamically adjust the extension or retraction of individual support columns 106 to redistribute the lifting effort and maintain synchronized, balanced elevation of the load 104. In some embodiments, load sensor 118*b*** may trigger operational limits, fault responses, or safety interlocks if the detected force exceeds a predefined threshold, thereby protecting both the equipment and a user from unsafe lifting conditions.

With continued reference to FIG. 1, each lifting unit of the plurality of lifting units further comprises an indicator 138. For the purposes of this disclosure, an "indicator" is a signaling component that provides a user with feedback related to a lifting unit. In some cases, indicator 138 may include a visual indicator. For the purposes of this disclosure, a "visual indicator" is a type of indicator configured to provide visible signals or feedback to a user. As a non-limiting example, visual indicator may include one or more light-emitting elements such as light emitting diodes (LEDs), backlit displays, screen icons, or illuminated symbols positioned on a lifting unit 102, system controller 130, or remote interface. In some cases, indicator 138 may include an audio indicator. For the purposes of this disclosure, an "audio indicator" is a type of indicator configured to emit sound. As a non-limiting example, audio indicator may include components such as buzzers, speakers, or piezoelectric sounders integrated into a lifting unit 102 or control interface.

With continued reference to FIG. 1, lift system 100 includes a system controller 130. For the purposes of this disclosure, a "system controller" is a subsystem configured to manage, coordinate, and execute lifting operations by generating and transmitting control signals to one or more components of a lifting unit. In some cases, system controller 130 is communicatively connected to each lifting unit of a plurality of lifting units 102. As a non-limiting example, system controller 130 may include components such as a microcontroller, signal processor, user interface, RF communication module, or wired control interface. In some cases, system controller 130 may be housed within a standalone controller. In some cases, system controller 130 may be integrated within a user device 140. In some cases, system controller 130 may be integrated directly into one or more of lifting units 102.

With continued reference to FIG. 1, in some cases, each lifting unit 102 of a plurality of lifting units may further include a scooting mechanism 141. In some cases, scooting mechanism 141 may be configured to horizontally move a lifting unit 102 across the ground surface so as to position a lift plate 112 beneath the at least a portion of a load 104. For the purposes of this disclosure, a "scooting mechanism" is a structural and functional feature of a lifting unit configured to enable horizontal displacement of the lifting unit across a ground surface. In a non-limiting example, scooting mechanism 141 may allow lifting unit 102 to be maneuvered in small adjustments so that a lift plate 112 may be positioned beneath at least a portion of a load 104 while the lifting unit 102 remains substantially upright. In some embodiments, scooting mechanism 141 may implement ground-engagement and maneuvering features. In a non-limiting example, scooting mechanism 141 may include a contact surface or base edge at base assembly 108 that normally rests flush against the ground surface to provide stability during lifting, but which may be temporarily lifted or tilted by maneuver of a handle 116. This action may create a small clearance between the base assembly 108 and the ground surface, allowing the lifting unit 102 to be pushed or pulled horizontally across the ground surface in short increments. When the desired horizontal adjustment is complete, continuing the non-limiting example, release of the downward force may allow the base assembly 108 of the lifting unit 102 to return to full contact with the ground surface, restoring stability for lifting operations. In some cases, scooting mechanism 141 may include or implement actuator 136, pump mechanism 128, auxiliary wheels, base assembly 108, wheels 114, sensor 118, handler 116, lift plate 112, electric motor 126 and the like. In some cases, when load sensor detects that load 104 is distributed onto only a portion of lift plate 112 and tilt sensor detects that lifting unit 102 is tilted relative to the ground surface, system controller 130 may determine that lifting unit 102 is not fully scooted into position beneath load 104. Such a condition may indicate that lift plate 112 is only partially supporting load 104, which may lead to instability or uneven force distribution during lifting. In response, system controller 130 may actuate scooting mechanism 141 to horizontally reposition lifting unit 102 so that lift plate 112 is properly aligned beneath at least a portion of load 104. In another embodiment, sensor 118 may be configured to detect the position of load 104 relative to lift plate 112 before load 104 is fully placed onto lift plate 112. For example, and without limitation, sensor 118 may include an optical sensor, ultrasonic sensor, or proximity sensor oriented to monitor the alignment of load 104 as it is moved toward lift plate 112 or monitor the position of lifting unit 102. In such cases, sensor 118 may determine whether load 104 is centered, offset, or misaligned relative to lift plate 112 prior to contact. Based on this pre-position detection, system controller 130 may actuate scooting mechanism 141 to adjust the horizontal position of lifting unit 102 so that lift plate 112 is better aligned with load 104. Alternatively or additionally, system controller 130 may generate an alert 144 and actuate indicator 138, providing feedback to a user that the lifting unit 102 should be repositioned.

With continued reference to FIG. 1, in some embodiments, scooting mechanism 141 may include one or more auxiliary wheels that are selectively deployable to facilitate horizontal repositioning of a lifting unit 102 and retractable to maintain full ground contact of base assembly 108 during lifting operations. For the purposes of this disclosure, "auxiliary wheels" are deployable and retractable wheels integrated into a scooting mechanism that enables horizontal repositioning of a lifting unit. In some cases, auxiliary wheels may be constructed from durable materials such as steel, polyurethane, or high-strength composites. In some cases, auxiliary wheels may be housed within slots or recessed channels formed in a lower portion of base assembly 108. In some cases, linear actuator, wedge cam, or similar linkage mechanism may be used to extend auxiliary wheels from the housing into ground contact and retract them when no longer needed. In some embodiments, deployment and retraction of auxiliary wheels may be hydraulically actuated. For example, and without limitation, auxiliary wheels may be coupled to a hydraulic cylinder tied to the same hydraulic system that powers a lifting actuator (actuator 136) of support column 106. By selectively pressurizing the hydraulic cylinder, auxiliary wheels may be extended into ground contact for scooting, and by releasing hydraulic pressure, the auxiliary wheels may retract into base assembly 108. In another embodiment, auxiliary wheels may be permanently mounted in ground contact but paired with extendable stoppers or a locking mechanism configured to selectively inhibit wheel rotation. In some cases, auxiliary wheels may be mounted on the sides of base assembly 108. As a non-limiting example, each side of base assembly 108 may include three auxiliary wheels. As a non-limiting example, each side of base assembly 108 may include four auxiliary wheels. In some cases, auxiliary wheels may be positioned in a linear arrangement along the length of base assembly 108 to distribute contact forces evenly when deployed. In some cases, auxiliary wheels may be staggered or offset to accommodate variations in ground surface conditions and to improve stability during scooting operations. In some embodiments, auxiliary wheels may be rotatably mounted on axles housed within reinforced brackets integrated into base assembly 108. In some cases, auxiliary wheels may be free-rolling. In other cases, auxiliary wheels may include bearings to reduce friction and enable smoother horizontal displacement. In some embodiments, one or more auxiliary wheels may be powered by an electric motor 126 to assist in repositioning of lifting unit 102 across the ground surface.

With continued reference to FIG. 1, in a non-limiting example, auxiliary wheels may remain retracted when lifting unit 102 is in an upright lifting position, thereby ensuring that the base assembly rests directly on the ground surface to provide stability and prevent unintended rolling. When horizontal displacement of lifting unit 102 is desired, auxiliary wheels may be deployed into ground contact, enabling the lifting unit 102 to be scooted or rolled across the ground surface. In some cases, deployment and retraction of auxiliary wheels may be achieved through a variety of mechanisms. In some cases, auxiliary wheels may be mechanically actuated by a lever or handle 116 connected to a cam or linkage assembly. In other cases, auxiliary wheels may be actuated by a hydraulic or electromechanical actuator (e.g., actuator 136, pump mechanism 128, and the like) controlled by a system controller 130 or by a user using a handle 116. Once deployed, continuing the non-limiting example, auxiliary wheels may reduce friction between base assembly 108 and the ground surface, enabling lifting unit 102 to be moved with less effort. When the auxiliary wheels are retracted, lifting unit 102 stabilized for vertical lifting, with the base assembly 108 in full contact with the ground.

With continued reference to FIG. 1, in some cases, handle 116 may serve as both a steering device and a hydraulic pump lever. In a non-limiting example, when a user pumps handle 116 in an up-and-down motion, the motion may actuate a small hydraulic pump (e.g., pump mechanism 128) of a scooting mechanism 141. This pump may draw hydraulic fluid from a reservoir and direct it under pressure into a hydraulic cylinder. Inside the hydraulic cylinder, pressurized hydraulic fluid may push against a piston or ram (e.g., hydraulic actuator), which in turn raises scooting mechanism 141. To lower scooting mechanism 141, handle 116 may be moved to a release position. As a non-limiting example, handle 116 may include a release trigger, wherein squeezing or rotating the release trigger integrated into the handle 116 may open a release valve in a hydraulic circuit, allowing pressurized fluid inside the hydraulic cylinder to flow back into the reservoir. As pressure is released, the piston may retract and the scooting mechanism 141 may descend.

With continued reference to FIG. 1, in some cases, system controller 130 may include circuitry such as without limitation a processor communicatively connected to a memory; for instance, circuitry may include and/or be included in a computing device. Processor may include any computing device as described in this disclosure, including without limitation a microcontroller, microprocessor, digital signal processor (DSP) and/or system on a chip (SoC) as described in this disclosure. Processor may include, be included in, and/or communicate with a mobile device such as a mobile telephone or smartphone. Processor may include a single computing device operating independently, or may include two or more computing device operating in concert, in parallel, sequentially or the like; two or more computing devices may be included together in a single computing device or in two or more computing devices. Processor may interface or communicate with one or more additional devices as described below in further detail via a network interface device. Network interface device may be utilized for connecting processor to one or more of a variety of networks, and one or more devices. Examples of a network interface device include, but are not limited to, a network interface card (e.g., a mobile network interface card, an LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor may include but is not limited to, for example, a computing device or cluster of computing devices in a first location and a second computing device or cluster of computing devices in a second location. Processor may include one or more computing devices dedicated to data storage, security, distribution of traffic for load balancing, and the like. Processor may distribute one or more computing tasks as described below across a plurality of computing devices of computing device, which may operate in parallel, in series, redundantly, or in any other manner used for distribution of tasks or memory between computing devices. Processor may be implemented, as a non-limiting example, using a "shared nothing" architecture.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor may be designed and/or configured to perform any method, method step, or sequence of method steps in any embodiment described in this disclosure, in any order and with any degree of repetition. For instance, processor may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system controller 130 is communicatively connected to a plurality of lifting units 102. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, a system controller 130 is configured to receive a user input 124. For the purposes of this disclosure, a "user input" is any data inputted to a user interface by a user. The user interface 142 is described below. As a non-limiting example, user input 124 may include a command, instruction, or control signal initiated by a user. In some cases, user input 124 may be directed to a system controller 130 to initiate, modify, or terminate one or more functions of a lifting unit 102. In some embodiments, user input 124 may be provided through physical controls such as buttons, switches, joysticks, or dials located on a control panel, lifting unit 102, or user device 140. In other embodiments, user input 124 may be entered through a digital interface such as a touchscreen, keypad, or wireless communication module, including RF or Bluetooth-enabled devices. In a non-limiting example, user input 124 may specify actions such as initiating vertical translation, selecting lifting height, synchronizing multiple lifting units 102, activating safety features, or the like.

With continued reference to FIG. 1, for the purposes of this disclosure, a "user" is an individual who interacts with a lifting system. In some cases, user may include any individual or system that is responsible for overseeing the deployment, positioning, and actuation of one or more lifting units 102 during use. As a non-limiting example, a user may include a technician, field operator, construction worker, warehouse personnel, or any other individual authorized to control or supervise a lifting system 100.

With continued reference to FIG. 1, for the purposes of this disclosure, a "user interface" is a means by which a user and a computer system interact. For example through the use of input devices and software. A user interface 142 may include a graphical user interface (GUI), command line interface (CLI), menu-driven user interface, touch user interface, voice user interface (VUI), form-based user interface, any combination thereof and the like. In some embodiments, user interface 142 may operate on and/or be communicatively connected to a decentralized platform, metaverse, and/or a decentralized exchange platform associated with the user. For example, a user may interact with user interface 142 in virtual reality. In some embodiments, a user may interact with the user interface 142 using a computing device distinct from and communicatively connected to a system controller 130. For example, a smart phone, smart, tablet, or laptop operated by a user. In an embodiment, user interface 142 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, system controller 130 may receive user input 124 from a user device 140. For the purposes of this disclosure, a "user device" is any device a user uses to input data. As a non-limiting example, user device 140 may include a laptop, desktop, tablet, mobile phone, smart phone, smart watch, kiosk, screen, smart headset, or things of the like. In some embodiments, user device 140 may include an interface configured to receive inputs from a user. In some embodiments, a user may manually input any data into system controller 130 using user device 140. In some embodiments, a user may have a capability to process, store or transmit any information independently.

With continued reference to FIG. 1, in some embodiments, system controller 130 may receive any types of data (e.g., user input 124, sensor data 122, data related to a lifting operation, and the like) disclosed herein from a database. In some cases, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some cases, system controller 130 may be configured to receive sensor data 122. For the purposes of this disclosure, "sensor data" is data obtained from one or more sensors. In some cases, system controller 130 may be configured to receive sensor data 122 from at least a sensor 118 (e.g., tilt sensor 118, load sensor 118, and the like), user device 140, database, and the like. As a non-limiting example, sensor data 122 may include information related to tilt angle, load force, vertical position, temperature, or system diagnostics. In some cases, sensor data 122 may be continuously or intermittently transmitted to a system controller 130. In some cases, system controller may be configured to interpret sensor data 122 for purposes such as determining angular deviation, detecting overload conditions, verifying synchronization among lifting units, or triggering safety interlocks. For example, and without limitation, sensor data 122 from tilt sensor 118*a* may indicate whether a lifting unit 102 is deviating from a stable orientation. For example, and without limitation, sensor data 122 from load sensor 118*b* may indicate imbalanced force distribution across a lifting system 100.

With continued reference to FIG. 1, a system controller 130 is configured to generate a lifting command 120. For the purposes of this disclosure, a "lifting command" is a control signal or set of instructions to initiate, regulate, or terminate a vertical translation of a load. In some cases, lifting command 120 may govern operational parameters of a lifting operation. As a non-limiting example, lifting command 120 may include govern direction (upward or downward), speed, synchronization among multiple lifting units 102, and positioning limits. In some embodiments, lifting commands 120 may include pre-programmed sequences or interrupt conditions to respond to environmental factors, system faults, or load changes. In some cases, lifting command 120 may be stored in a database. System controller 130 is configured to generate lifting command 120 as a function of as a function of a user input 124. In a non-limiting example, a user may press an "UP" button on a user interface 142 on a smartphone and a system controller 130 may receive this user input 124 and generate a lifting command 120 instructing all connected lifting units 102 to extend their support columns 106 at a predefined speed, thereby initiating upward vertical translation of a load 104. In another non-limiting example, a user may select a "SYNC LIFT" mode from a settings menu, prompting a system controller 130 to generate a synchronized lifting command that includes timing and feedback coordination data to ensure that all lifting units 102 raise a load 104 simultaneously and uniformly, maintaining positional alignment throughout a lifting operation.

With continued reference to FIG. 1, in some cases, system controller 130 may be configured to generate lifting command 120 as a function of sensor data 122. In another non-limiting example, sensor data 122 from a tilt sensor 118*a* of a lifting unit 102 may indicate that the lifting unit's support column 106 is deviating from a vertical axis beyond a predefined angular threshold. In response, a system controller 130 may generate a lifting command 120 that temporarily halts a vertical extension or retraction of that specific lifting unit 102 while allowing other lifting units to continue or halts a vertical extension or retraction of all lifting units 102 in a lifting system 100, thereby preventing further imbalance or potential tipping. Alternatively, or concurrently, system controller 130 may generate an alert 144 indicating potential tipping. The alert 144 described herein is described below. For the purposes of this disclosure, a "predefined angular threshold" is a fixed or configurable limit that defines the maximum allowable angular deviation of a lifting unit. In some cases, beyond a predefined angular threshold, a system controller 130 may initiate corrective or protective actions. In a non-limiting example, when a measured tilt angle of a lifting unit 102 exceeds a predefined angular threshold, a system controller may respond by generating a lifting command 120 to halt vertical translation, adjust the actuation speed of specific lifting units 102, activate an indicator 138, or issue an alert 144 to a user interface 142. In some cases, a predefined angular threshold may be stored in a system controller 130 or database and used as a comparison value against sensor data 122 (e.g., from tilt sensor 118*a*). In some cases, a user may manually determine a predefined angular threshold. In some cases, predefined angular threshold may be determined based on factors such as the center of gravity of a lifting unit 102, terrain conditions, load distribution, and overall system design. In some embodiments, a predefined angular threshold may be adjustable by a user or automatically recalibrated based on deployment conditions.

With continued reference to FIG. 1, in another non-limiting example, sensor data 122 from a load sensor 118*b* received from each lifting unit 102 may reveal that one lifting unit is bearing a greater proportion of the total load than the others. Based on this imbalance, a system controller 130 may generate lifting commands 120 that adjust an actuation rate or lifting pressure of individual lifting units 102 to redistribute the load more evenly, maintaining synchronized elevation and structural stability across the system. Alternatively, or concurrently, system controller 130 may generate an alert 144 indicating the imbalance of the load. For the purposes of this disclosure, an "actuation rate" is a speed or temporal rate at which a mechanical component is extended or retracted during a lifting operation. For example, and without limitation, if one lifting unit 102 is lifting faster than another, a load may become unevenly distributed or misaligned and a system controller 130 can therefore adjust an actuation rate of individual lifting units 102 based on sensor data 122 from a load sensor 118*b*.

With continued reference to FIG. 1, in another non-limiting example, sensor data 122 may indicate that a lifting unit 102 has reached a maximum safe lifting height, as determined by a position sensor or encoder. The system controller 130 may then generate a lifting command 120 that prevents further upward motion while continuing to lift the remaining lifting units 102 until all units reach the same vertical position or halts the vertical extraction of all lifting units 102. Alternatively, or concurrently, system controller 130 may generate an alert 144 indicating the imbalance of the load. In another non-limiting example, system controller 130 may generate lifting command 120 based on sensor data 122 in response to conditions where a ground surface is uneven. For instance, and without limitation, when a lifting unit 102 is deployed on irregular or sloped terrain, sensor data 122 from tilt sensor 118*a* from one or more lifting units 102 may indicate that the lifting units 102 are inclined at different angles relative to a central vertical axis, reflecting the unevenness of the ground surface. In some cases, a system controller 130 may compare an angular deviation with a predefined angular threshold and determine that one or more lifting units 102 are at risk of instability due to excessive inclination.

With continued reference to FIG. 1, a system controller 130 is configured to transmit a lifting command 120 to each of a plurality of lifting units 102. In some embodiments, lifting command 120 may be transmitted from a system controller 130 to each lifting unit 102 through a wired or wireless communication interface. In a wireless configuration, in some cases, a control assembly may include a radio frequency (RF) transmitter, and each lifting unit 102 may be equipped with a corresponding RF receiver and onboard microcontroller configured to decode and execute a received lifting command 120. In some cases, in a wired configuration, lifting command 120 may be transmitted through a hardwired communication bus or signal cable that connects the system controller 130 to each lifting unit 102. In some cases, lifting command 120 may be encoded using serial communication protocols or pulse-width modulation signals. Once received, each lifting unit 102 may process a lifting command 120 through its onboard controller and actuate its lifting mechanism (e.g., actuator 136, pump mechanism 128, and the like).

With continued reference to FIG. 1, in some cases, a system controller 130 may be configured to activate an indicator 138 as a function of sensor data 122 from at least a sensor 118. For example, and without limitation, if a tilt sensor 118*a* detects that a lifting unit 102 has deviated beyond a predefined angular threshold, a system controller 130 may activate a visual indicator, such as a red LED or flashing light, to alert a user to the instability. For example, and without limitation, if a load sensor 118*b* detects an uneven force distribution among a plurality of lifting units 102, a system controller 130 may activate an audio indicator to notify a user of a potential overload condition or imbalance.

With continued reference to FIG. 1, in some cases, a system controller 130 may be configured to generate an alert 144 as a function of sensor data 122 and transmit the alert 144 to a user interface 142. For the purposes of this disclosure, an "alert" is a notification or signal that indicates information requiring user awareness or intervention. In some cases, an alert 144 may be used to convey critical, warning, or informational states associated with an operation of a lifting unit 102 or lifting system 100. As a non-limiting example, alert 144 may indicate excessive tilt, overload, synchronization failure, low battery, or system faults. In some cases, an alert 144 may be transmitted to a user interface 142. As a non-limiting example, alert 144 may include a visual message, flashing indicator, audible signal, or graphical display element. For example, and without limitation, if sensor data 122 from tilt sensor 118*a* indicates that a central vertical axis of a lifting unit 102 deviates beyond a predefined angular threshold, a system controller 130 may generate an alert 144 indicating an unsafe inclination and transmit that alert 144 to a touchscreen interface, where a warning message and visual icon are displayed. In another non-limiting example, if load sensors 118 detect that one lifting unit 102 is bearing a disproportionately high share of the total load, a system controller 130 may issue an alert 144 notifying a user of a potential imbalance condition.

Figure 2:
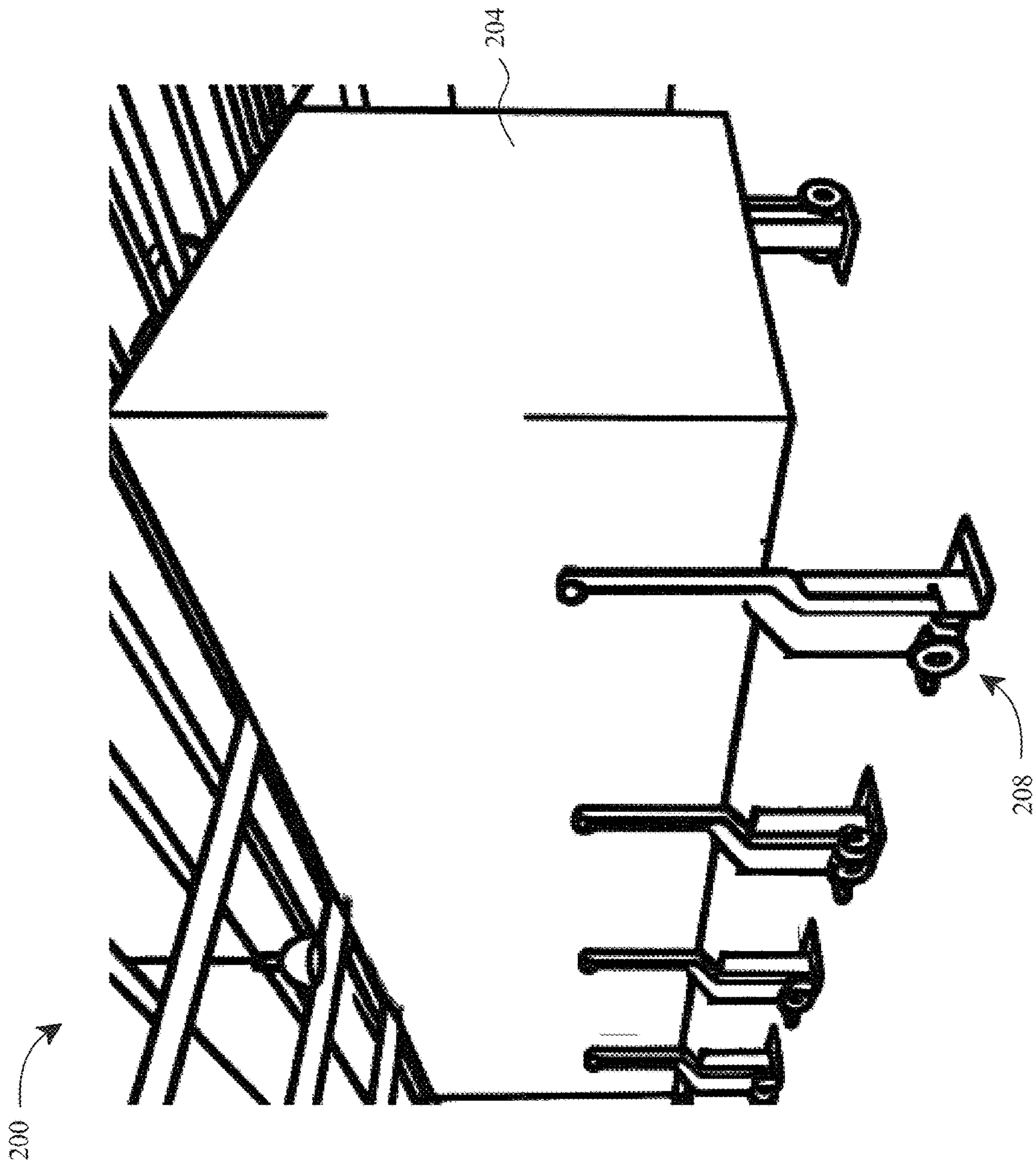
FIG. 2 illustrates an exemplary lifting system.

Referring now to FIG. 2, an exemplary lifting system 200 with a load 204 is illustrated. In some embodiments, lifting system 200 may include a plurality of lifting units 208. Each lifting unit 208 may be positioned at a distinct location along the perimeter of a load 204 to support and vertically translate the load 204 in a coordinated manner. Lifting units 208 may operate in synchronized fashion to ensure uniform lifting across all contact points. Each lifting unit 208 may include support columns, lift plates, and base assemblies configured to stably interface with a ground surface and a load 204.

Figure 3:
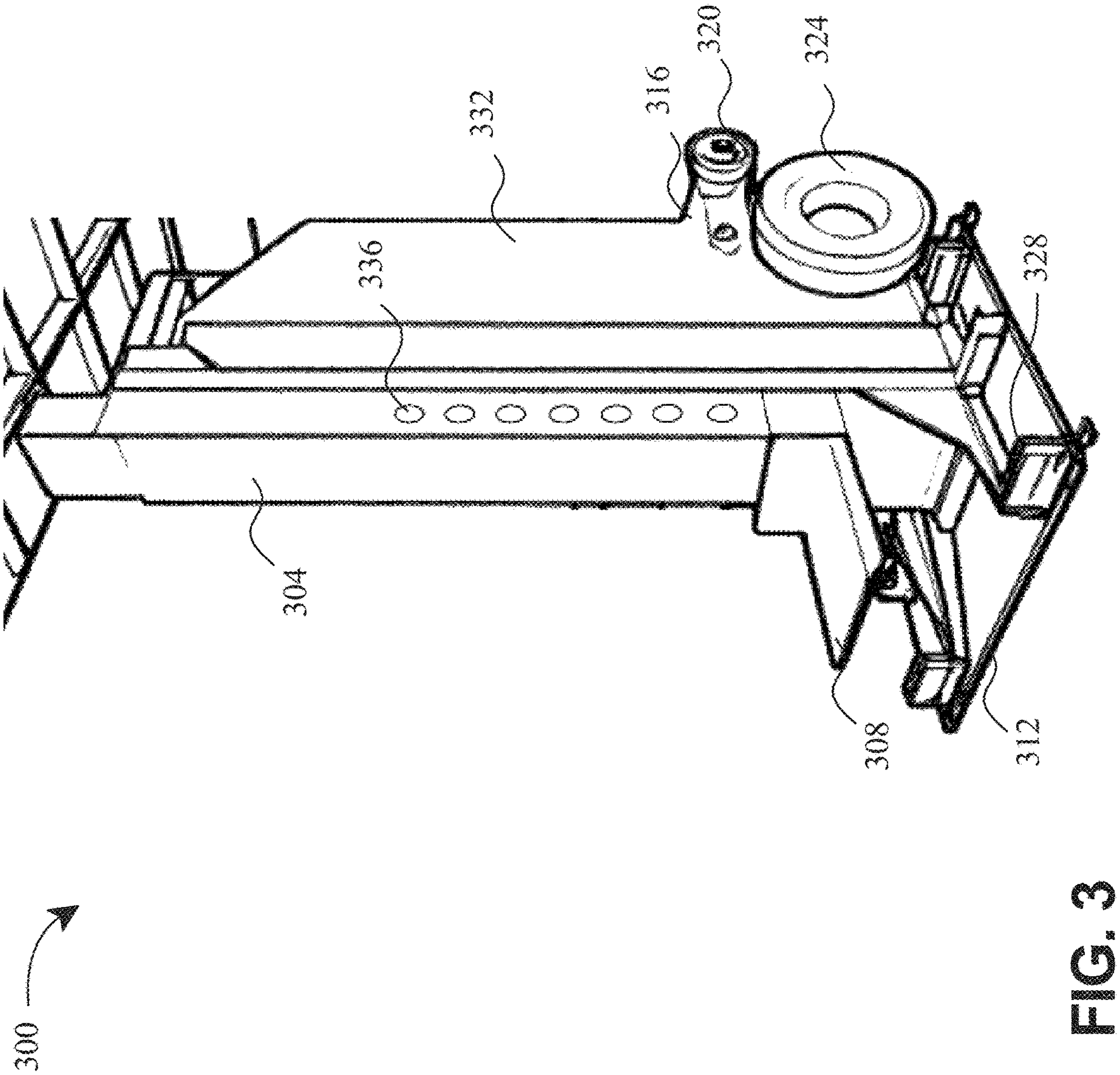
FIG. 3 illustrates a front perspective view of an exemplary lifting unit.

Referring now to FIG. 3, a front perspective view of an exemplary lifting unit 300 is illustrated. In some cases, lifting unit 300 may include support column 304, lift plate 308, base assembly 312, anti-tip mechanism including a protruding contact structure 316 and ground contact roller 320, wheels 324, fork pocket 328, electric motor housing 332, and the like. In some cases, support column 304 may define a plurality of apertures 336. In some cases, apertures 336 may be configured to receive one or more locking pins to secure a vertical position of a lift plate 308 at discrete height intervals. In some cases, base assembly 312 may be configured to rest on a ground surface and provide structural support for a vertical actuation of a support column 304. In some cases, wheels 324 may be coupled to a base assembly 312 to enable manual transport or positioning of a lifting unit 300. In some cases, anti-tip mechanism may be operatively positioned to engage with a ground surface when a lifting unit 300 is tilted, maintaining a fixed transport position and preventing the lifting unit 300 from rotating beyond a safe tilt angle during movement. In some cases, protruding contact structure 316 may be configured to engage with a ground surface when a lifting unit 300 is tilted such that a central vertical axis of the lifting unit 300 is oriented at a tilt angle relative to the ground surface. In some cases, protruding contact structure 316 may include a ground contact roller 320 positioned at an end of the protruding contact structure 316 as illustrated in FIG. 3, wherein the ground contact roller 320 may be configured to engage with the ground surface and roll along the ground surface when the lifting unit 300 is in the fixed transport position. In some cases, lift plate 308 may be detachably mounted to a support column 304. In some cases, electric motor housing 332 may enclose electric motor.

Figure 4:
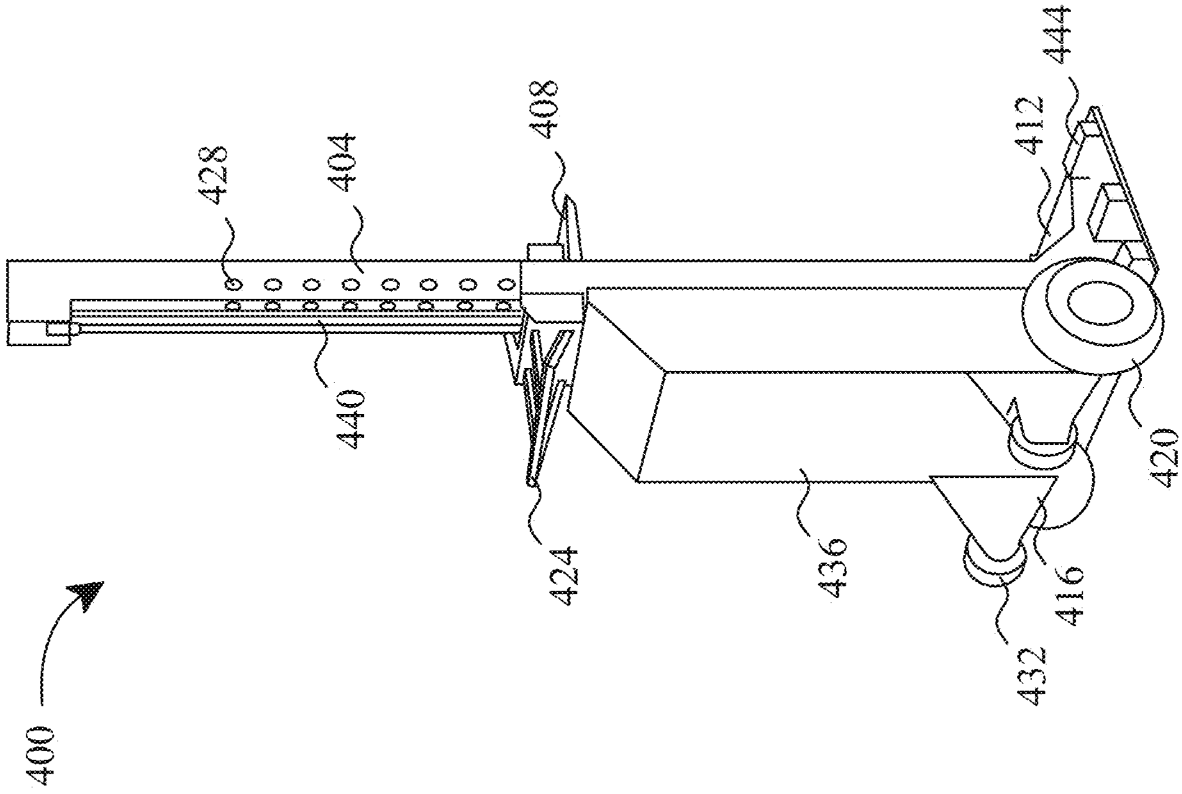
FIG. 4 illustrates a rear perspective view of an exemplary lifting unit.

Referring now to FIG. 4, a rear perspective view of an exemplary lifting unit 400 is illustrated. In some cases, lifting unit 400 may include support column 404, lift plate 408, base assembly 412, anti-tip mechanism including a protruding contact structure 416, wheels 420, handle 424, and the like. In some cases, support column 404 may define a plurality of apertures 428. In some cases, handle 424 may be ergonomically positioned on a rear portion of a lifting unit 400. In some cases, handle 424 may be used by a user to tilt and guide a lifting unit 400 during manual relocation. In some cases, protruding contact structure 416 may include ground contact roller 432 positioned at an end of the protruding contact structure 416. In some cases, anti-tip mechanism including protruding contact structure 416 and ground contact roller 432 may be affixed to an electric motor housing 436, wherein the electric motor housing 436 may enclose an electric motor. In some cases, an electric motor may actuate a pumping mechanism that supplies pressurized fluid to actuator or hydraulic actuator to initiate a movement of lift plate 408 or support column 404. In some cases, actuator may include a hydraulic actuator. In some cases, hydraulic actuator may include of a cylinder 440 or fluid motor that uses hydraulic power to facilitate mechanical operation. In some cases, base assembly 412 may include fork pocket 444. For the purposes of this disclosure, a "cylinder" of a hydraulic actuator is a pressure-containing chamber of the hydraulic actuator in which fluid power is converted into mechanical linear motion. In a non-limiting example, cylinder 440 may include a tubular structure that houses a movable piston or ram. When pressurized hydraulic fluid is introduced into a cylinder 440, in some cases, cylinder 440 may act upon the piston, generating force that causes the piston rod to extend or retract along the cylinder's longitudinal axis. In some cases, cylinder 440 of a hydraulic actuator may include steel or reinforced alloys. In some cases, cylinder 440 may include sealed end caps, fluid ports for connection to a hydraulic pump mechanism, and internal sealing elements that maintain pressure integrity and guide the motion of the piston. In a non-limiting example, cylinder 440 of a hydraulic actuator may be mounted in line with or parallel to a support column 404. In some cases, cylinder 440 of a hydraulic actuator may be configured to drive vertical translation of a lift plate 408, raising or lowering a load in response to lifting commands generated by a system controller.

Referring now to FIG. 5A, a side view of an exemplary lifting unit 500*a* in a fixed transport position is illustrated. In some cases, lifting unit 500*a* may include support column

504, lift plate 508, base assembly 512, anti-tip mechanism including a protruding contact structure 516, wheels 520, handle 524, and the like. In some cases, support column 504 may include a plurality of apertures 528. In some embodiments, anti-tip mechanism may be configured to provide mechanical resistance to rotational displacement of a lifting unit 500*a* relative to a ground surface 532, thereby maintaining a fixed transport position when the lifting unit 500*a* is tilted and moved. In a non-limiting example, in a fixed transport position, a lifting unit 500*a* may be intentionally inclined (e.g., rearward) so that wheels 520 engage the ground for rolling, while an anti-tip mechanism or structural stop maintains the lifting unit 500*a* at a consistent tilt angle 536 to prevent over-rotation or tip-over. For example, and without limitation, tilt angle 536 may quantify a degree to which a lifting unit 500*a* has been inclined from its upright position during operations such as manual transport or positioning. As a non-limiting example, tilt angle 536 may range from 40 degrees to 60 degrees. For example, and without limitation, anti-tip mechanism may be configured to maintain a fixed transport position of each lifting unit 500*a* such that a central vertical axis 540 of the lifting unit 500*a* is oriented at a 49-degree tilt angle 536 relative to a ground surface 532. In some cases, protruding contact structure 516 may include ground-contact roller 544 positioned at an end of the protruding contact structure. In some cases, anti-tip mechanism including protruding contact structure 516 and ground-contact roller 544 may be affixed to an electric motor housing 548.

Referring now to FIG. 5B, a side view of an exemplary lifting unit 500*b* in an interim tilt position is illustrated. In some cases, lifting unit 500*b* may be oriented such that central vertical axis 540 is inclined at an interim tilt angle 552 relative to ground surface 532. In this interim tilt position, wheels 520 may be in contact with ground surface 532, while rear edge 556 of base assembly 512 also engages ground surface 532. In some embodiments, interim tilt angle 552 may be smaller than 90 degrees, which may correspond to upright lifting position, and larger than fixed transport angle at which a ground-contact roller of anti-tip mechanism engages the ground surface. By supporting lifting unit 500*b* in this orientation, the interim tilt position allows a user to rest lifting unit 500*b* before applying additional downward tilting force to transition the lifting unit 500*b* into fixed transport position.

Referring now to FIG. 5C, a side view of an exemplary lifting unit 500*c* in an upright lifting position is illustrated. In an upright lifting position, central vertical axis 540 may be substantially perpendicular to a ground surface. As illustrated, wheels 520 may be attached to lifting unit such that a bottommost surface of each wheel is elevated above the ground surface by a first distance 560. In some cases, a ground-contact roller of an anti-tip mechanism may be elevated above the ground surface by a second distance 564, wherein the second distance 564 may be greater than the first distance 560. In some cases, scooting mechanism of lifting unit 500*c* may enable controlled horizontal movement of lifting unit 500*c* in forward direction 572 or rearward direction 576 (as illustrated in FIG. 5C) while maintaining upright lifting position. In some cases, lifting unit 500*c* may include auxiliary wheels 568 integrated into a scooting mechanism. Auxiliary wheels 568 may be selectively deployed to engage the ground surface, enabling the lifting unit 500*c* to be displaced horizontally while remaining in upright lifting position. When auxiliary wheels 568 are retracted, lifting unit 500*c* may return to full ground contact through its base assembly.

Figure 6:
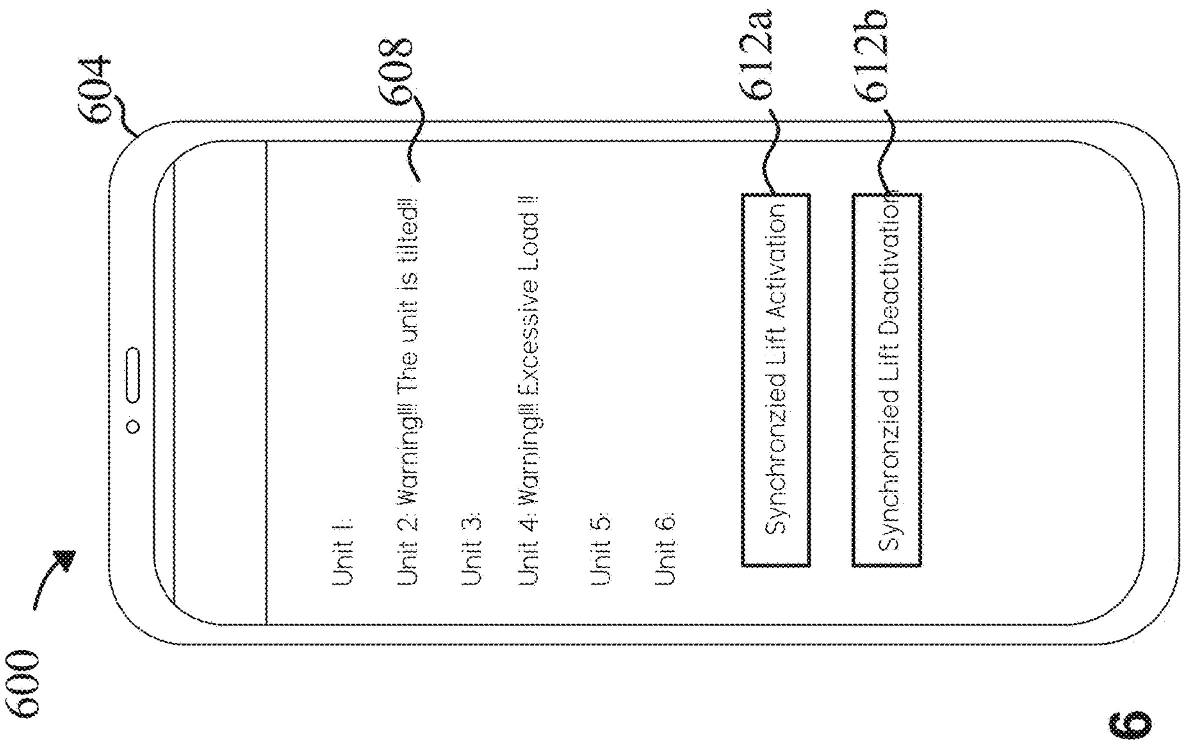
FIG. 6 illustrates an exemplary user interface.

Referring now to FIG. 6, an exemplary user interface 600 is illustrated. In some cases, user interface 600 may be displayed on a user device 604. In some cases, user interface 600 may include an alert 608. In some cases, system controller may generate an alert 608 and transmit the alert 608 to user interface 600 in response to sensor data from individual lifting units. As a non-limiting example, alert 608 may indicate tilt or load imbalance conditions. As another non-limiting example, user interface 600 may display operational status, battery levels, operational parameter, or vertical positions for each lifting unit. In some cases, user interface 600 may be configured to receive user input for controlling lift operation. In some cases, user interface 600 may include graphical elements 612*a-b*. As a non-limiting example, graphical element 612*a* may include a button configured to transmit a user input for initiating synchronized lift operation across a plurality of lifting units. In some embodiments, graphical element 612*b* may include a button configured to transmit a user input for deactivating or halting synchronized lift operations.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
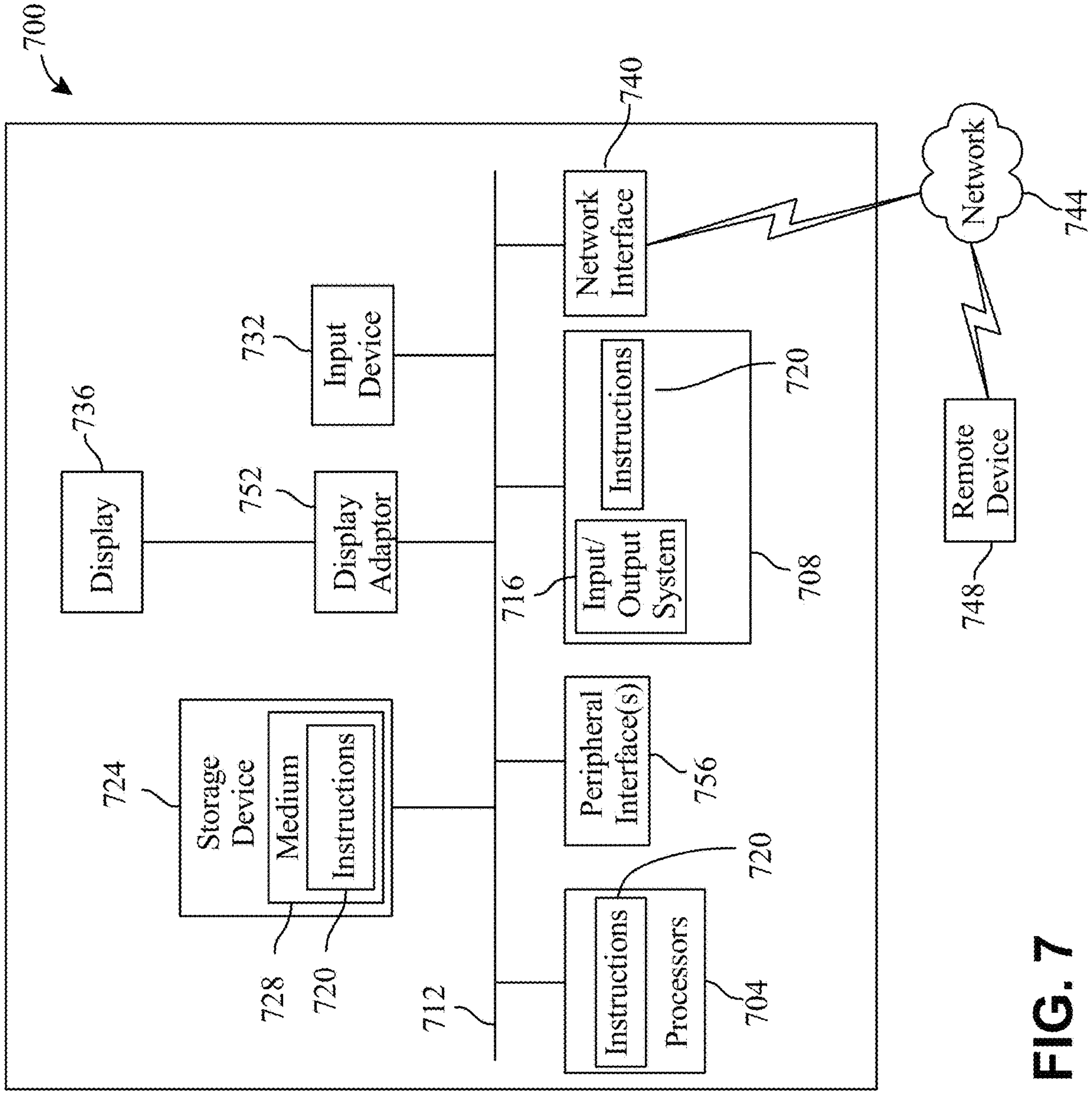
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A lifting system with stable and synchronized lifting operation, the lifting system comprising:

a plurality of lifting units, wherein:

the plurality of lifting units are configured to vertically translate a load in a synchronous action; and each lifting unit of the plurality of lifting units comprises:

a support column configured to vertically extend and retract as a function of a lifting command;

a lift plate detachably mounted on the support column, wherein at least a portion of the load is configured to be positioned on the lift plate;

a base assembly configured to support the support column on a ground surface; and an anti-tip mechanism configured to provide mechanical resistance to rotational displacement of each lifting unit relative to a ground surface, thereby maintaining a fixed transport position when each lifting unit is tilted and moved;

a plurality of wheels configured to enable mobility of each lifting unit of the plurality of lifting units across the ground surface; and an electric motor housing, wherein the plurality of wheels is attached to the electric motor housing at a first distance relative to the ground surface such that, in an upright lifting position, a bottommost surface of each of the plurality of wheels is elevated above the ground surface; and a system controller communicatively connected to each lifting unit of the plurality of lifting units, wherein the system controller is configured to:

receive a user input;

generate the lifting command as a function of the user input; and transmit the lifting command to each of the plurality of lifting units.

2. The lifting system of claim 1, wherein:

the support column defines a plurality of apertures; and the lift plate comprises at least one locking pin configured to engage with the plurality of apertures.

3. The lifting system of claim 1, wherein each of the plurality of lifting units comprises an electric motor within the electric motor housing, wherein the plurality of wheels are operatively connected to and powered by the electric motor.

4. The lifting system of claim 3, wherein each lifting unit of the plurality of lifting units further comprises a handle, wherein the handle comprises a release mechanism configured to halt actuation of the plurality of wheels powered by the electric motor upon release of the handle by a user.

5. The lifting system of claim 1, wherein each lifting unit of the plurality of lifting units further comprises an interim tilt mechanism configured to support the lifting unit in an interim tilt position at an interim tilt angle relative to the ground surface, wherein the interim tilt position is defined by a rear edge of the base assembly and the plurality of wheels in contact with the ground surface.

6. The lifting system of claim 5, wherein application of a downward tilting force to the lifting unit transitions the lifting unit from the interim tilt position to the fixed transport position in which the plurality of wheels and the anti-tip mechanism are in contact with the ground surface.

7. The lifting system of claim 1, wherein the anti-tip mechanism is affixed to the electric motor housing at a second distance relative to the ground surface, wherein the second distance is longer than the first distance.

8. The lifting system of claim 1, wherein the anti-tip mechanism comprises a protruding contact structure, wherein the protruding contact structure is configured to engage with the ground surface when each lifting unit is tilted such that a central vertical axis of each lifting unit is oriented at a tilt angle relative to the ground surface.

9. The lifting system of claim 8, wherein the protruding contact structure of the anti-tip mechanism comprises a ground contact roller positioned at an end of the protruding contact structure, wherein the ground contact roller is configured to engage with the ground surface and roll along the ground surface when each lifting unit is in the fixed transport position.

10. The lifting system of claim 1, wherein each lifting unit of the plurality of lifting units further comprises a scooting mechanism, wherein the scooting mechanism is configured to horizontally move the lifting unit across the ground surface so as to position the lift plate beneath the at least a portion of the load.

11. The lifting system of claim 1, further comprising a plurality of sensors wherein each lifting unit of the plurality of lifting units further comprises at least one sensor of the plurality of sensors, wherein the at least one sensor comprises a tilt sensor configured to detect angular deviation of the support column relative to a central vertical axis perpendicular to the ground surface.

12. The lifting system of claim 11, wherein the plurality of sensors include a plurality of load sensors, wherein the at least one sensor further comprises a load sensor of the plurality of load sensors configured to measure a force exerted on the lift plate from the at least a portion of the load.

13. The lifting system of claim 12, wherein the system controller is communicatively connected to the at least one sensor, and the system controller is further configured to:

receive sensor data from the plurality of load sensors;

identify a lifting unit, of the plurality of lifting units, that bears a greater portion of the load relative to the other lifting units of the plurality of lifting units in the lifting system as a function of the sensor data; and generate the lifting command, wherein the lifting command is configured to adjust an actuation rate of the identified lifting unit.

14. The lifting system of claim 11, wherein the system controller is communicatively connected to the at least one sensor, and the system controller is further configured to:

receive sensor data from the tilt sensor; and generate the lifting command as a function of the sensor data, wherein the lifting command is configured to stop a vertical extension and retraction of the plurality of lifting units.

15. The lifting system of claim 14, wherein the system controller is further configured to:

generate an alert as a function of the sensor data; and transmit the alert to a user interface.

16. The lifting system of claim 11, wherein each lifting unit of the plurality of lifting units further comprises an indicator, wherein the system controller is configured to activate the indicator as a function of the detection by the at least one sensor, wherein the indicator comprises an audio indicator.

17. The lifting system of claim 1, wherein the support column comprises an actuator configured to extend and retract the lift plate in response to the lifting command, wherein the actuator comprises a hydraulic actuator.

18. The lifting system of claim 17, wherein the support column comprises a pump mechanism, wherein the pump mechanism is configured to supply pressurized fluid to the actuator to initiate a movement of the lift plate.

19. The lifting system of claim 1, wherein each lifting unit of the plurality of lifting units further comprises a fork pocket.

* * * * *